US008805912B2

(12) United States Patent
Nakanishi

(10) Patent No.: US 8,805,912 B2
(45) Date of Patent: Aug. 12, 2014

(54) ORDERING GENERATING METHOD AND STORAGE MEDIUM, AND SHARED MEMORY SCALAR PARALLEL COMPUTER

(75) Inventor: Makoto Nakanishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 432 days.

(21) Appl. No.: 13/165,272

(22) Filed: Jun. 21, 2011

(65) Prior Publication Data

US 2012/0078991 A1     Mar. 29, 2012

(30) Foreign Application Priority Data

Sep. 27, 2010 (JP) ................................. 2010-216136

(51) Int. Cl.
*G06F 7/38* (2006.01)

(52) U.S. Cl.
USPC .......................................... 708/446; 708/520

(58) Field of Classification Search
None
See application file for complete search history.

(56) References Cited

U.S. PATENT DOCUMENTS

| 6,470,368 | B1 | 10/2002 | Garg et al. | |
|---|---|---|---|---|
| 2009/0171636 | A1 | 7/2009 | Shimizu | |
| 2009/0292511 | A1* | 11/2009 | Vrancic et al. | 703/2 |

FOREIGN PATENT DOCUMENTS

| JP | 2008-299641 | 12/2008 |
|---|---|---|
| JP | 2009-025962 | 2/2009 |
| JP | 2010-224682 | 10/2010 |
| WO | 2008/026261 A1 | 3/2008 |

OTHER PUBLICATIONS

Karypis, George et al., "A Fast and High Quality Multilevel Scheme for Partitioning Irregular Graphs", SIAM Journal on Scientific Computing, vol. 20, No. 1, 1999, pp. 359-392.
Davis, T. A. "Direct Methods for Sparse Linear Systems", SIAM 2006, pp. 1-79.
JPOA—Japanese Office Action mailed Apr. 22, 2014 issued in corresponding Japanese Patent Application No. 2010-216136 with Partial English translation.
Ryuji Nishide, "Direct Solver for Sparse Linear Equations with Dynamic Block Size Selection", IPSJ Research Paper, Information Processing Society of Japan, Mar. 8, 2002, vol. 2002, section 22, pp. 157-162, 2002-ARC-147, 2002-HPC-89 (CS-NG-2004-00398-023). [For relevance, please see English-translation of JPOA filed herewith].
Hikaru Samukawa, "Parallelization of Direct Solution of Simultaneous Linear Equations", Simulation, Nippon Steel Technology Information Center, Sep. 15, 2008, vol. 27, section 3, pp. 161-169, Special Feature, Parallelization Techniques of Electromagnetic Fields Analysis Programs (CS-NG-2008-00871-005).
Aho, A, V, "Design and Analysis of Algorithms I", SAIENSU-SHA Co., Ltd, Oct. 30, 1977, First Edition, pp. 49-53 (CS-NB-1997-00163-001).

* cited by examiner

*Primary Examiner* — Michael D Yaary
(74) *Attorney, Agent, or Firm* — Fujitsu Patent Center

(57) ABSTRACT

When a Cholesky decomposition or a modified Cholesky decomposition is performed on a sparse symmetric positive definite matrix using a shared memory parallel computer, the discrete space in a problem presented by the linear simultaneous equations expressed by the sparse matrix is recursively sectioned into two sectioned areas and a sectional plane between the areas. The sectioning operation is stopped when the number of nodes configuring the sectional plane reaches the width of a super node. Each time the recursively halving process is performed, a number is sequentially assigned to the node in the sectioned area in order from a farther node from the sectional plane. The node in the sectional plane is numbered after assigning a number to the sectioned area each time the recursively halving process is performed.

5 Claims, 22 Drawing Sheets

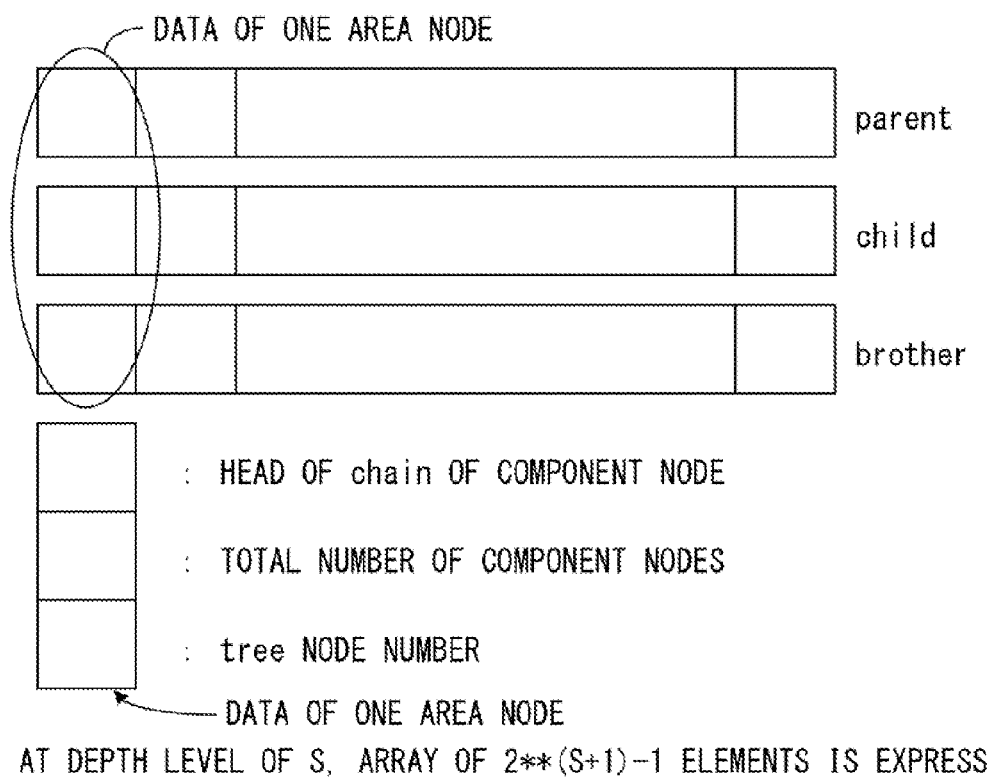
F I G. 8A

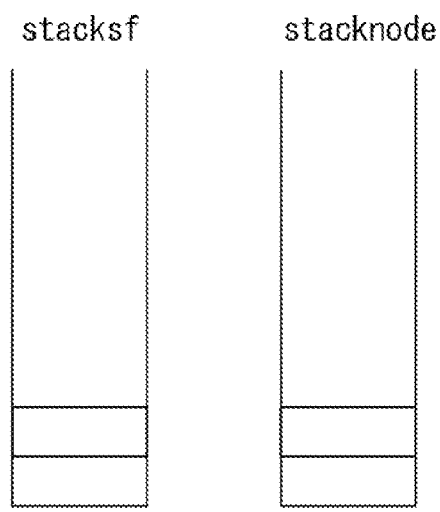
F I G. 10

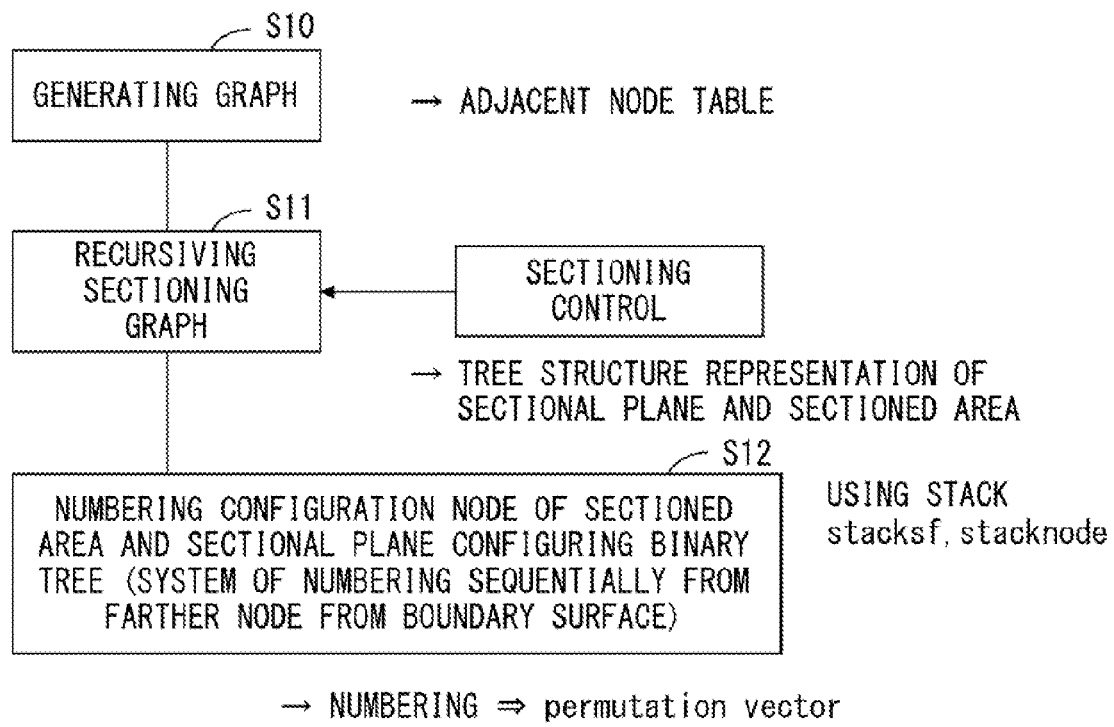
F I G. 1 1

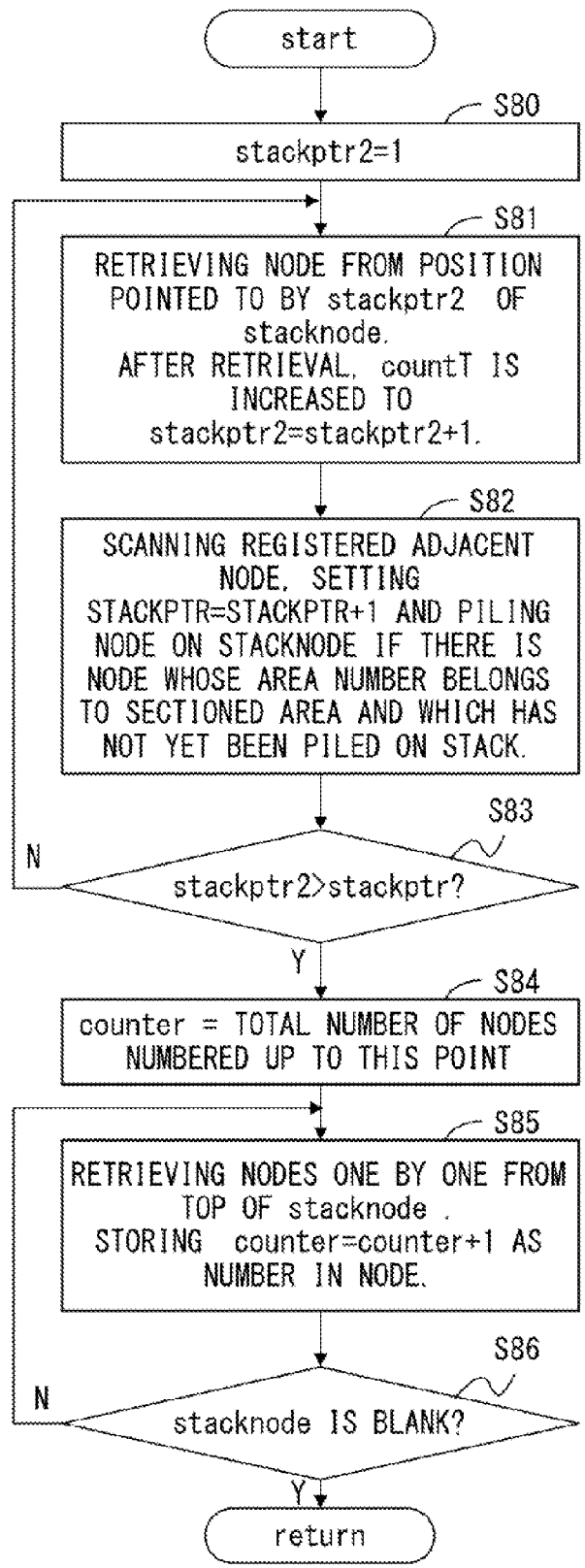
F I G. 2 0

ORDERING GENERATING METHOD AND STORAGE MEDIUM, AND SHARED MEMORY SCALAR PARALLEL COMPUTER

CROSS-REFERENCE TO RELATED APPLICATIONS

This application is based upon and claims the benefit of priority of the prior Japanese Patent Application No. 2010-216136, filed on Sep. 27, 2010, the entire contents of which are incorporated herein by reference.

FIELD

The present invention relates to a method of generating ordering when a Cholesky decomposition or a modified Cholesky decomposition is performed on a sparse symmetric positive definite matrix.

BACKGROUND

In a solution for linear simultaneous equations expressed by a sparse symmetric positive definite matrix (Ax=b where A indicates sparse symmetric positive definite matrix, x indicates a variable column vector, and b indicates a constant column vector), the position of a nonzero element in a corresponding matrix can be changed by changing the arrangement of the variables in a variable column vector. The rearrangement is referred to as ordering. It is known that the fill-in portion of LDL ^T decomposition (a matrix element which is zero in the original matrix, but nonzero as a result of the decomposition) can be reduced by performing appropriate ordering. In the LDL ^T decomposition, a sparse matrix A is decomposed into A=LDL^T, thereby solving the linear simultaneous equations Ax=b. In this example, L indicates a lower triangular matrix, and ^T specifies matrix transposition.

The dependence of the data update between matrix elements in the LDL ^T decomposition about the column of the lower triangular matrix portion L including the diagonal element of a sparse symmetric positive definite matrix is expressed by a tree structure referred to as an elimination tree. For the elimination tree, refer to the non-patent document 1. Based on the dependence, the decomposition is performed in the direction from the leaf (a node having no child node in the component nodes configuring an elimination tree) to the root (a node having no parent node).

The calculation of decomposition can be independently performed on a subtree having no common portion between elimination trees, and can be processed in parallel.

A nested dissection is typical ordering. A nested dissection refers to a method of sectioning a space into two sectioned areas and a sectional face between the sectioned areas, and numbering them. For the nested dissection, refer to the non-patent document 1. Furthermore, a sparse matrix is expressed by a graph, the graph is sectioned into two subgraphs having the substantially equal number of configuration nodes so that the smallest possible number of nodes can be removed for the sectioning process. The sectioning process is recursively repeated, and is repeated until it cannot be performed any more. The thus obtained ordering is referred to as the ordering by standardized nested dissection.

The sectioning divides nodes into nodes forming a sectional face and nodes of sectioned areas. Assuming that two sets of nodes are sets A and B sectioned by a sectional face relating to the sectioning at a certain level, the component nodes belonging to the set A are assigned sequential numbers, then the component nodes belonging to the set B are assigned sequential numbers, and finally component nodes configuring the sectional face are assigned sequential number continuously not to be further sectioned. The numbering rule can also be applied to a recursively sectioned portion.

It is known that the ordering of the nested dissection generated as a result refers to ordering with a small fill-in portion.

Although the LDL ^T decomposition is described above, the decomposition is referred to a modified Cholesky decomposition to which substantially the same algorithm as the Cholesky decomposition (LL ^T decomposition) can be applied When the linear simultaneous equations for a sparse symmetric positive definite matrix are solved by the Cholesky decomposition, a fill-in portion is commonly reduced by rearranging the rows or columns of a matrix. The rearrangement is referred to as ordering. The Cholesky decomposition is performed on the rearranged matrix.

The Cholesky decomposition is conducted by two phases, that is, a symbolic decomposition and a numeric decomposition. The symbolic decomposition analyzes the dependence of each column, and expresses the result on the elimination tree. Using the information, a generation pattern of nonzero elements in the sparse matrix is analyzed.

The generation pattern of nonzero elements in the Cholesky decomposition is analyzed by generating an elimination tree. When the simultaneous equations of Ax=b (A=$(a_{ij})$) are solved by the Cholesky decomposition, it is decomposed into A=LL^T where L indicates a lower triangular matrix. An elimination tree is generated by coupling after retrieving a child configuration node from the first configuration node using the following theorem.

Theorem

In the Cholesky decomposition LL^T=A, excluding a numerical cancellation, the node i is a child node of the node k when $a_{ki} \neq 0$ and k>i (refer to the non-patent document 1).

The node k is referred to as a parent n of the node i, and the data corresponding to the node i is the data of the i-th column of the matrix A. The component node of the elimination tree corresponds to the lattice point of the corresponding number. Therefore, the component node i corresponds to the lattice point i of a discrete space, and the data of the component node i is the data of the column i of the matrix A.

In deriving performance by processing in parallel the Cholesky decomposition on a large sparse symmetric positive definite matrix, the subtrees not crossing one another in an elimination tree can be independently calculated. Therefore, the calculation can be performed in parallel on independent subtrees. Otherwise, the parallel performance can be derived by sequentially performing pipeline processing for the process of updating a column according to the propagation of the influence of the update of the elements of a sparse matrix indicated by an elimination tree. In addition, it is important to configuring a block by bundling columns and increasing the computational complexity in enhancing the parallel effect. When a large amount of data is read in one data read, the frequency of low speed data reading/writing operations can be reduced, thereby enhancing the parallel processing effect. Therefore, the nonzero element generation pattern for the same column configures a super node. When a super node is configured, only the data of rows having nonzero values are held when the columns configuring the super node are combined. Therefore, since it is not necessary to hold data of the rows of zero, the data can be compressed, stored, and processed.

Furthermore, to improve the performance of the Cholesky decomposition, a super node is configured by moderating the conditions and combining the columns similar in nonzero pattern as a result of the decomposition. As a result of the combination, in the updating process of the Cholesky decomposition, a row including excess zero in the data of the super node is generated, thereby increasing the computational complexity. However the memory access per unit computational complexity can be reduced. Therefore, the improvement of the performance of the Cholesky decomposition can be expected. The parallel processing of the Cholesky decomposition can be logically performed in parallel in the calculation for each column. However, since the frequency of memory access and the computational complexity is low, the overhead of the parallel processing is not ignorable, and the parallel processing effect cannot be easily derived.

That is, to perform efficient parallel processing, it is effective to increase the granularity to reduce the overhead of the parallel processing.

The fill-in portion can be logically minimized by rearranging a matrix using the ordering by a complete nested dissection (a numbering method by performing spatial sectioning up to utmost step), and performing the calculation of the Cholesky decomposition column by column without combining the columns. A super node is generated by combining columns as data read to one reading operation to cache to derive performance, and the process of combining columns is performed from the column as a leaf of the elimination tree. When columns are combined in the Cholesky decomposition using the ordering of the nested dissection, it is necessary to combine nodes having a number of branches of the elimination tree to increase the width of a column-combined block.

A branch node has a number of nonzero elements common with a branch source node, but there can be a number of nonzero elements not common between branch nodes. Therefore, when a number of nodes are combined, and a number of branch nodes are included, the number of zeros suddenly increases. Accordingly, there has been the problem that it is difficult to find an appropriate block width of a super node while gradually increasing the number of zeros.

When nested dissection ordering is used while expecting the effect of reducing fill-in portions, computational complexity occurs on one column at a portion corresponding to the leaf of the binary tree structure of the elimination tree generated by the nested dissection unless columns are combined. Although the fill-in portion is reduced, the expected performance may not be acquired because the overhead becomes outstanding by a reduced ratio of memory access to the computation and a low granularity of parallel processing.

Refer to non-patent document 1 for the details of the basic technique directly used for the solution of a sparse matrix.

<Ordering Generated from Nested Dissection and its Elimination Tree>

The problem in a two-dimensional square area is considered. The case in which a sparse symmetric positive definite matrix is acquired by discrete partial differential equations representing the problem in this area is considered. In this case, the discrete lattice points are combined with adjacent lattice points in the area.

The x-y plane is assumed as illustrated in FIG. 1. By removing the set a of the lattice points configuring the straight lines parallel to the y axis from the lattice points configuring the area, the set of the lattice points configuring the area is halved so that the number of lattice points configuring each portion is substantially equal to each other.

Each of the two remaining areas is similarly halved by removing the set b of the lattice points horizontally parallel to the x axis so that the number of lattice points of each portion can be substantially equal to each other. To halve the set to have substantially equal number of lattice points, the area can be sectioned to allow each section to have the lattice points of the number obtained by dividing the total number of lattice points in the area to be sectioned by 2. The procedure is recursively continued until the area which has been generated and become smaller by the sectioning operation cannot be further sectioned. Not to be further sectioned refers to having the number of lattice points of 3 included in the small area obtained by the sectioning operation, and not allowing the next operation of sectioning the area into four portions. Finally, the area is sectioned into 2**n small areas.

The process corresponds to the selection for a smaller number of lattice points configuring the boundary line to be removed by equally sectioning the area.

The numbers are sequentially assigned to a set of lattice points configuring one area in two areas generated by the sectioning operation. Next, numbers are continuously assigned to the lattice points removed by the halving operation.

Numbers are assigned to the set generated by the above-mentioned sectioning operation by recursively applying the rule. The elimination tree of the matrix arranged by the numbering process is a binary tree.

That is, for example, assume that a Laplace's equation ($\Delta\phi=0$) is to be solved in a discrete space. In the case of a one-dimensional problem, a Laplacian is a second order partial differential equation of coordinates. Therefore, if $\phi(i)$ is a function value in the lattice point i, the discrete Laplace's equation is expressed as follows.

$$\{\phi(i+1)+\phi(i-1)-2\phi(i)\}/h^2=0$$

where h indicates the distance between adjacent lattice points. It is represented by the following matrix.

$$\frac{1}{h^2}\begin{pmatrix} \ddots & & & & & 0 \\ & 1 & -2 & 1 & & \\ & & 1 & -2 & 1 & \\ & & & 1 & -2 & 1 \\ 0 & & & & & \ddots \end{pmatrix}\begin{pmatrix} \vdots \\ \phi(i-1) \\ \phi(i) \\ \phi(i+1) \\ \phi(i+2) \\ \phi(i+3) \\ \vdots \end{pmatrix}=\begin{pmatrix} \vdots \\ 0 \\ 0 \\ 0 \\ 0 \\ 0 \\ \vdots \end{pmatrix} \quad \text{[math 1]}$$

As clearly indicated above, when adjacent lattice points are continuously numbered, coefficients are generated adjacently in a sparse matrix. However, when lattice points are sectioned as described above, sequential numbers appear on adjacent lattice points in the sectioned areas. Therefore, coefficients are concentrated. However, the coefficients corresponding to the lattice points separately sectioned and numbered are generated in places apart from other coefficients. Therefore, when an elimination tree of such a matrix is generated, the trees corresponding to the columns in which coefficients are concentrated are combined with each other, but separate columns are independent of each other. Therefore, when an area is sectioned into areas A and B, and C as a boundary area for the areas A and B, the component node of the elimination tree corresponding to the lattice point in the area A and the component node of the elimination tree corresponding to the lattice point in the area B are branched into two portions in and after the component node of the elimination tree corresponding to the lattice point of the boundary area C.

The binary tree is configured by branch nodes arranged in a linear array.

The numbering method in the recursive calling procedure is described below.

In the program code below, the function partition refers to the procedure of sectioning an area, and it is determined whether or not an area can be sectioned. If the area can be sectioned, the two sectioned areas are returned to seta and setb, and a sectional plane if returned to cutsuface. The "set" refers to a set of lattice points to be sectioned.

call numbering (set)
recursive procedure numbering (set)
call partition (set, seta, setb, cutsurface, icon)
if (partition is done) then ! Numbers are sequentially assigned in the numbering call order.
call numbering (seta) ! A number is assigned to seta.
call numbering (setb) ! A number is continuously assigned to setb.
call numbering (cutsurface) ! A number is assigned to cutsurface.
else
call numbering (set)
endif
return
end Relating to the algorithm of the partition, refer to non-patent document 2.

A three-dimensional problem can be similarly assumed. For example, for a cube, an area is substantially equally sectioned excluding the set of lattice points configuring a surface parallel to the y-z plane. Continuously, each of the two areas generated by the sectioning operation is similarly halved on the surface parallel to the x-z plane. As with the case in the two-dimensional problem, the sectioning operation is repeated until no further sectioning can be performed.

The same numbering rule is applied. The elimination tree of the rearranged matrix in the numbering operation is also a binary tree.

To apply them to the commonly coupled areas, the combination of the discrete lattice points is represented by a graph, the sectioning operation is repeated so that the number of nodes configuring the surfaces which section the graph can be minimized and the number of component nodes configuring the sectioned subgraphs can be leveled, thereby configuring a common nested dissection ordering. Also in this case, the elimination tree is a binary tree.

<Coupled Node (Super Node)>

Relating to the component nodes of subsequent node numbers in the columns of the matrix corresponding to the component node of the elimination tree, the nonzero pattern of a larger node pattern couples a column of a smaller node number to a column of an equal node number. Furthermore, the component nodes configuring a branch are checked, and relatively similar nonzero patterns which do not largely increase the ratio of zero elements are coupled. As a result, if the Cholesky decomposition is performed, the number of rows having nonzero elements increased in the rows of the coupled column vectors. That is, zero is included in the necessary area in compressing and storing the rows. Thus, the block generated by coupling the columns based on similar nonzero patterns is referred to as a panel.

FIG. 2 illustrates a panel and an index list.

A panel is provided with an index list correspondingly. An index list holds data about where in the row of the columns of the sparse matrix the data of the panel is located. Since the panel holds only the data of the nonzero elements other than the elements as common zero in the column held in the panel, the index list indicates wherein the row of the columns the held nonzero element is located in the columns. Since the panel does not hold the element as common zero in the held column, the actual value can be zero although it is held as a nonzero element.

The process of the Cholesky decomposition for each panel relatively reduces the load store cost of the memory because of increasing computational complexity with a larger block width. However, an unnecessary wasteful computation is performed on a zero element portion. Therefore, it is necessary to determine the block width by adjusting the block width by coupling with the number of included zero taken into account. It is important in deriving the performance.

A super node is a configuration node continuously detected in the elimination tree in which same nonzero element patterns are coupled, and only the lows having nonzero elements are collected, compressed, and stored. That is, data is held for only nonzero element rows, and data in the nonzero element rows is not held, thereby compressing the amount of data to be held.

FIG. 3 illustrates the state in which unnecessary zero is included in the panel.

In the component nodes of the parent of the elimination tree, those having matching nonzero element patterns are coupled, and only nonzero elements in each column is compressed and stored. It is defined as a panel. The nonzero pattern does not match that of the next parent node, but there is an inclusion relationship. That is, the row corresponding to the nonzero element in the next parent node is updated in the updating process in the decomposing process, and becomes a nonzero element. Therefore, the nonzero pattern of the next parent node is reflected in the panel. Such a relationship is referred to as an inclusion relationship. If the next parent node of this type is coupled to the panel, an unnecessary 0 is included. In the example illustrated in FIG. 3, an unnecessary zero is generated below the panel. In this case, the index and the coupled parent node have a number of uncommon portions with each other.

<When Branched Nodes are Coupled, the Number of Zeros Greatly Increases.>

The node connected to the end of the branch from a branched node corresponds to the node configuring a sectioned area in the nested dissection.

As a result of the Cholesky decomposition, a first node adjacent to a second node appears as a nonzero element of the column corresponding to the second node. In the process of the Cholesky decomposition, when a path is traced to the root of the elimination tree, the influence of the nonzero element is propagated as an element having an influence when update to another column is performed. That is, in the two areas sectioned on a surface, the node of the surface adjacent on another surface is propagated to a branch node as a nonzero element. Since the halved node group has no common element on the boundary surface other than the sectional plane, the nonzero element corresponding to the node outside the adjacent area is taken over by a branch node. That is, in the branch node, it is necessary to process a zero element as a nonzero element through a coupling process. That is, when branch nodes are coupled, zero greatly increases in panel width as a result of coupling the nodes configuring the branched of branch nodes.

In the nested dissection, it is difficult to adjust the number of zeros and the width of a panel because there are a number of branch nodes encountered while coupling the component nodes of the elimination tree.

Assume that a rectangular parallelepiped as illustrated in FIG. 4 has been generated as a result of some sectioning operations. The central portion is a set of nodes configuring a surface to be removed after halving the rectangular parallelepiped. Before the sectioning operation, these three portions are not separated. It is assumed that the surface is adjacent to another area before the sectioning operation.

When a node (lattice point) in a sectioned area is numbered, an appropriate number is assigned not to section the area. In this case, in the elimination tree, they are represented as a portion in the form of an inverted Y in the tree.

Considering the portion branched in the branch node, the elimination tree is halved below the branch node. The structure of the lower triangular matrix L as a result of the Cholesky decomposition is included in the structure of the nonzero pattern of the parent node. Therefore, the nonzero data of the nodes existing in other areas adjacent to the blocks other than the blocks A and C propagates from the position where it appears.

The description below is made using the column data. That is, the nonzero pattern of the two branch nodes z and w are exemplified in FIG. 5. That is, the node z is configured by a diagonal element, the nonzero element CCN generated from the configuration node of the block C, and the nonzero element AN generated from the external node of the block A adjacent to a block other than the block C. The node w is configured by a diagonal element, a nonzero element CCN generated from the configuration node of the block C, and the nonzero element BN generated from the external node of the block B adjacent to a block other than the client C. On the other hand, the branch node y is configured by a diagonal element, a nonzero element CCN generated from the configuration node of the block C, a nonzero element AN generated from the external node of the block A adjacent to a block other than block C, a nonzero element BN generated from the external node of block B adjacent a block other than the block C, and a nonzero element CN generated from an external node of the client C adjacent to a block other than the blocks A and B.

It is assumed that the sectioning operation is performed by sectioning an area so that the sectioned areas can be equal in size and the sectional plane can be minimized. That is, if AN can be substantially equal to BN, and there are a number of surfaces adjacent to external portions, the expression of AN~BN>CCN>CN holds.

As a result, as illustrated on the right in FIG. 5, a considerably large number of zeros suddenly increases.

When the sectioning operation is further performed until it cannot be performed any further, the structure is repeated.

DOCUMENTS OF PRIOR ART

Non-Patent Document

[Non-patent Document 1] T. DAVIS, "Direct Methods for Sparse Linear Systems" SIAM 2006

[Non-patent Document 2] George Karypis and Vipin Kumar, "A fast and high quality multilevel scheme for partitioning irregular graphs", SIAM Journal on Scientific Computing, Vol. 20, No. 1, pp. 359-392, 1999

As described above, although a high-speed process is planned by extending the width of a super node and enhancing the parallelism of computation, the number of zeros included in the super node becomes large when the width of the super node is large, thereby expanding wasteful computation. Thus, the effect of enhancing the parallelism by expanding the width of the super node is degraded. The number of zeros increases when the branch nodes of an elimination tree are coupled. Therefore, if the shape of the elimination tree includes less branch nodes, the problem can be moderated. The shape of the elimination tree depends on the arrangement of the nonzero elements in a matrix, and the arrangement of the nonzero elements depends on the method of numbering lattice points in a space. Therefore, using the lattice points numbered by an appropriate ordering process, the width of a super node can be expanded without suddenly increasing the number of zeros.

SUMMARY

An ordering generating method according to an aspect of the embodiment disclosed below is used when a sparse symmetric positive definite matrix is processed by a Cholesky decomposition or a modified Cholesky decomposition using a shared memory scalar parallel computer. The shared memory scalar parallel computer recursively performs the process of sectioning a set of component nodes configuring a graph expressing a sparse matrix into two sectioned areas and a sectional plane excluding a halving sectional plane until a width of a super node generated for coupling data of component nodes and holding it in cache memory can be obtained, sequentially assigns numbers to component nodes in order from farther component nodes from the sectional plane on one sectioned area generated by sectioning the set of component nodes by one sectioning operation, assigns numbers to component nodes in order from farther component nodes from the sectional plane on the other sectioned area, and finally assigns numbers to component nodes belonging to the sectional plane.

According to the embodiment below, when the Cholesky decomposition or the modified Cholesky decomposition is performed on a sparse symmetric positive definite matrix, a method of generating ordering which enables parallel processing to be performed in a high speed can be provided.

The object and advantages of the invention will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIGS. 8A and 8B are explanatory views (3) of the data structure used in an embodiment of the present invention;
FIG. 10 is an explanatory view (5) of the data structure used in an embodiment of the present invention;
FIG. 11 is a flowchart of the entire process according to an embodiment of the present invention.

FIG. 20 is a detailed process flow (9) according to an embodiment of the present invention.

DESCRIPTION OF EMBODIMENTS

Figure 1:
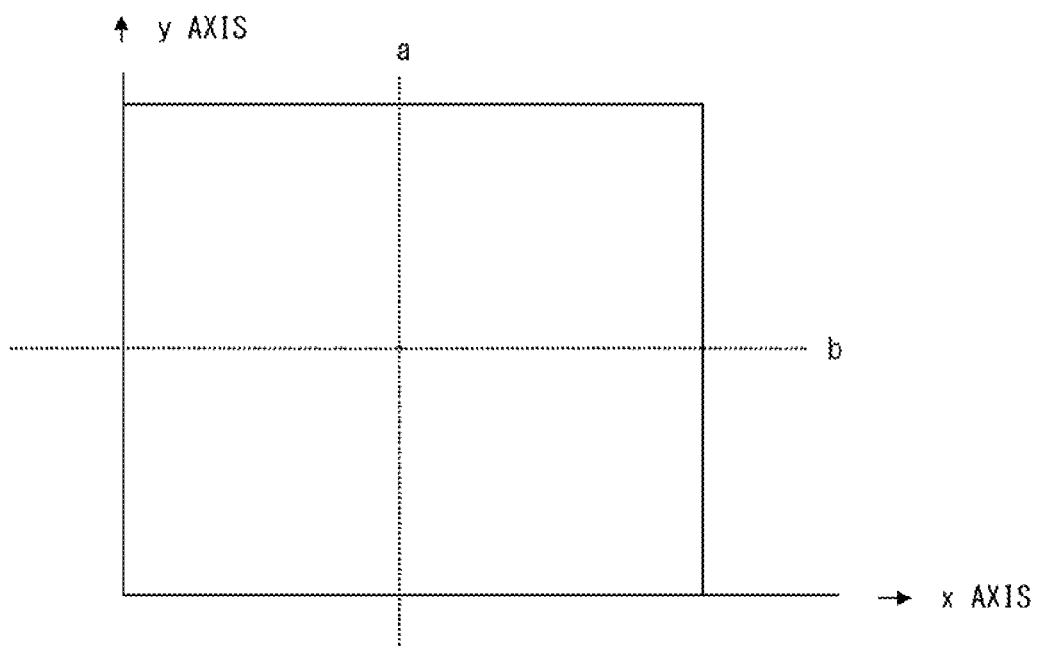
FIG. 1 is an explanatory view (1) of prior art.
Figure 2:
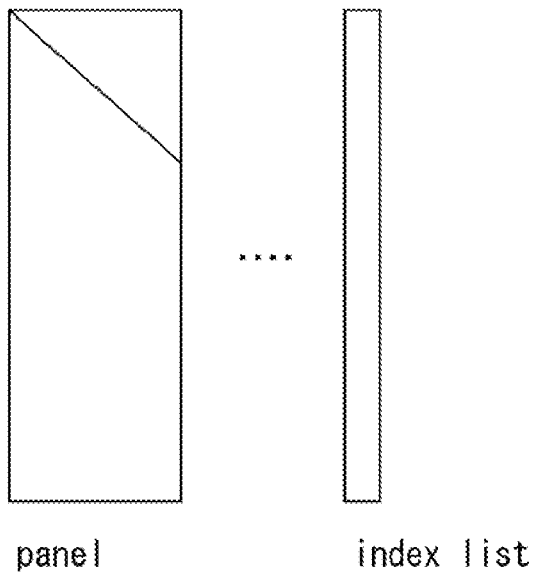
FIG. 2 is an explanatory view (2) of prior art.
Figure 3:
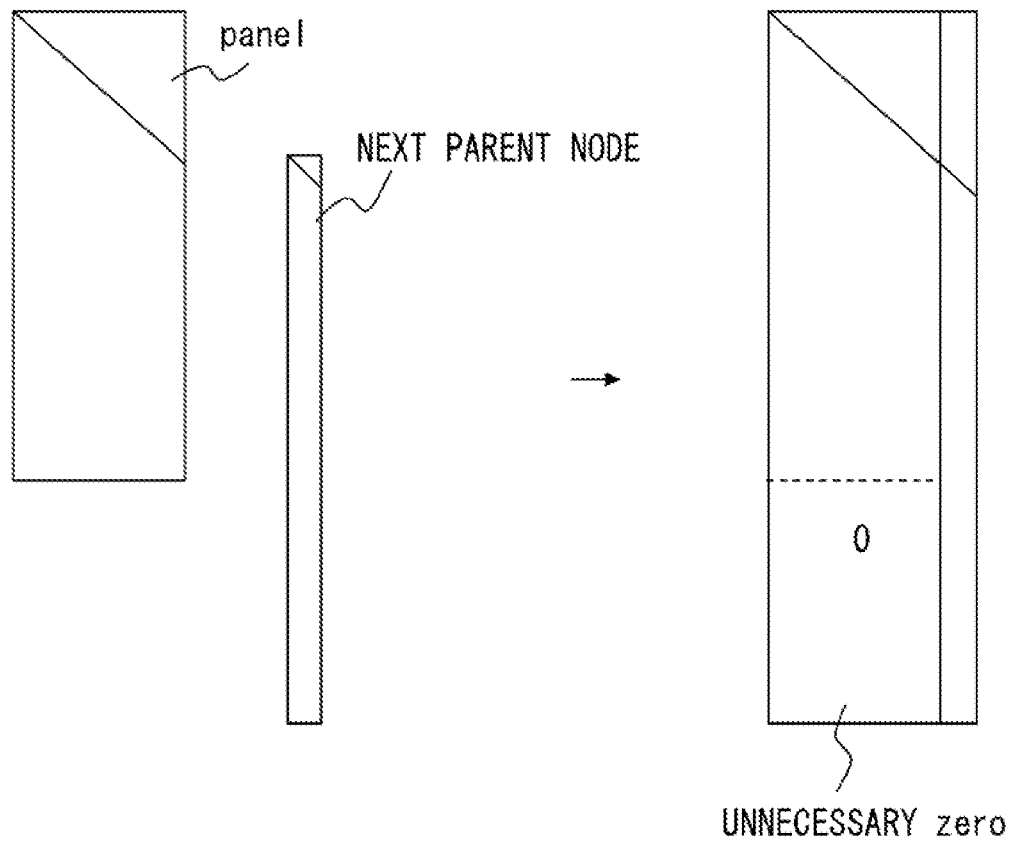
FIG. 3 is an explanatory view (3) of prior art.
Figure 4:
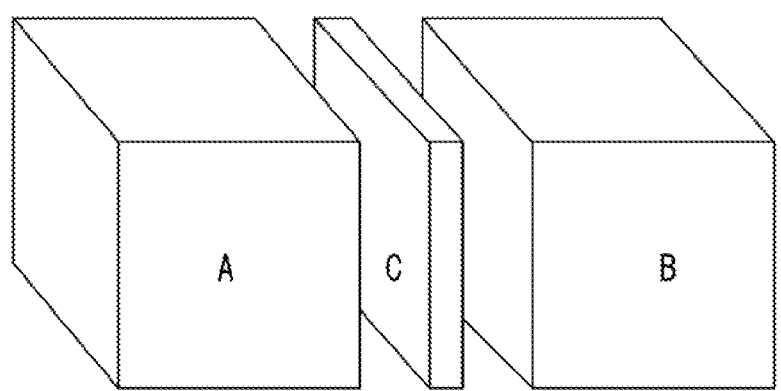
FIG. 4 is an explanatory view (4) of prior art.
Figure 5:
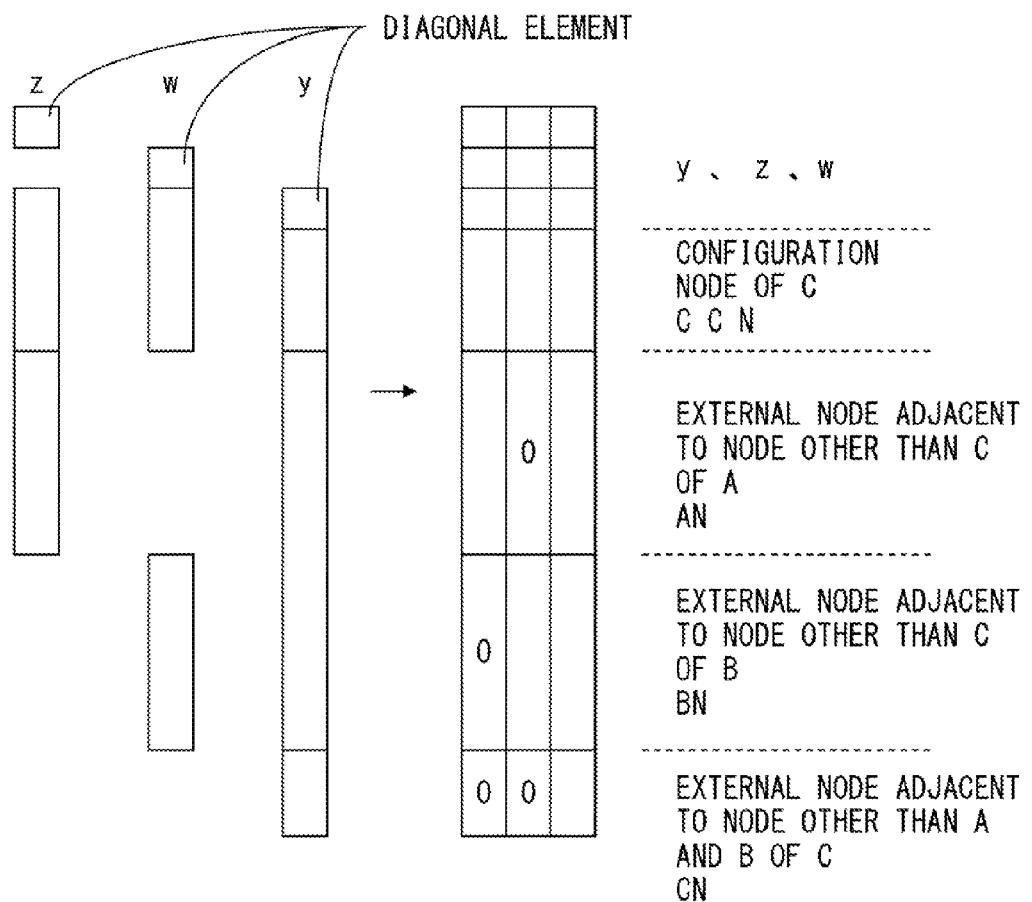
FIG. 5 is an explanatory view (5) of prior art.

According to the present invention, the sectioning operation of a graph is stopped at a certain depth and numbers are assigned in a set of two nodes finally halved on the sectional plane to derive the parallelism of high granularity and guarantee an effective block width of a super node by combining columns. Stopping the sectioning operation of a graph at a certain depth refers to determining whether or not the number of nodes configuring the sectional plane to be removed has been reduced to the size of the block width of a super node when considering the combination of nodes, and performing control to stop the recursive sectioning to be repeatedly performed at the depth when the reduction of the size is reached.

When the super node is configured, continuous columns forming the branches of the elimination tree are coupled. In this case, the numbering process is performed so that the number of zeros does not largely increase when a node is coupled. That is, when a super node is formed by coupling the columns, the number of zeros largely increases if branch nodes are coupled. Therefore, it is preferable that branch nodes can appear in the elimination tree as least as possible. The shape of the elimination tree depends on where in the position in the matrix the nonzero elements of a matrix appear. Where in the portion of the matrix the nonzero elements of the matrix appear depends on the numbering of the matrix elements. The numbering of the matrix elements depends on the method of numbering the lattice points performed when a space is discrete. The lattice points correspond to a component node of an elimination tree. Therefore, by devising the numbering of lattice points (component node), the width of a super node can be thicker without largely increasing the number of zeros. The width of the super node can be variable depending on the method of connecting component nodes, but a larger upper limit can be obtained. The thicker the width of a super node becomes, the higher the effect of the parallelism is enhanced. However, the width is to be appropriately set by considering the performance of the computer used by those skilled in the art. For example, the upper limit of the width of a super node can be the value obtained by coupling 50 through 100 columns.

To attain this, the width of the panel and the rate of the number of zeros can be controlled by suppressing further sectioning by the numbering of remaining areas after stopping the sectioning operation, and by arranging the sequence of nodes to gradually increase the number of zeros when nodes are coupled, thereby configuring an effective super node to derive the performance. In numbering the nodes in a block as a result of sectioning a space, there occurs the problem how the boundary nodes are to be numbered.

There are two methods depending on the speed of memory access.

1) The recursive sectioning of a graph is stopped at a certain depth (the sectioning operation is stopped when the number of nodes configuring the sectional plane to be removed reaches the level of the block width of the super node with the node coupling taken into account). When a number is assigned to the component node configuring each area of an area group generated by the halving operation at the final depth, a number is sequentially assigned to a node at a longer distance from the component node of the halving surface (sectional plane).

2) When all sectional planes adjacent to the generated sectioned areas are considered, a number is sequentially assigned to a node at a longer distance from all sectional planes to be removed when the nested dissection is generated.

In both methods 1 and 2 above, the nonzero elements are arranged in the belt shape on the sectional plane at the deepest level of the recursive sectioning.

The method 2 is appropriate when the memory access capable of deriving the performance without coupling a number of columns is realized at a high speed.

When the method 1 or 2 is used, the increase of the number of zeros is moderate although nodes are coupled. To suppress the occurrence of a number of zeros, coupling branch nodes is stopped, and super nodes are coupled by regarding the branches forming a straight line of the elimination tree.

FIGS. 6 through 10 are explanatory views of the data structure used in an embodiment of the present invention.

FIGS. 6 through 10 illustrate the data structure of a node adjacent to another node. The data is configured by a set of component nodes configuring a sectional plane, that is, a set of component nodes of the last sectioned graph, the tree structure recursively expressing the structure of branching from a set expressing the sectional plane into two branches (expressing the area node as a tree structure indicating each area when a discrete space is sectioned), and the number of configuration nodes of a set used when a number is assigned to each set.

In the description below, the node configuring an elimination tree is referred to as a component node, and the node configuring a tree structure indicating the state of branches in an area is referred to as an area node.

Figure 6:
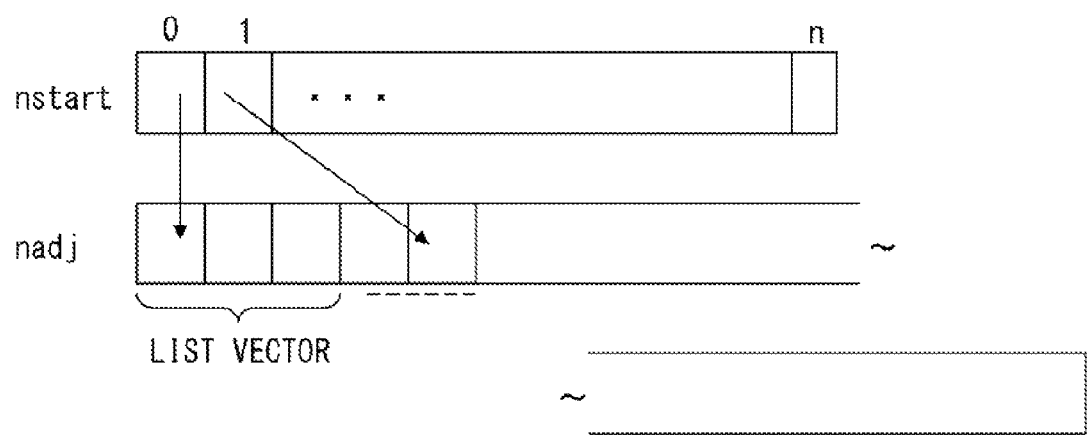
FIG. 6 is an explanatory view (1) of the data structure used in an embodiment of the present invention.

FIG. 6 illustrates a component node adjacent to each component node.

nadj (*) stores a node adjacent each component node in the list vector. nstart(n+1) indicates where in the one-dimensional array (nadj(*)) the node adjacent to the i-th component node is stored.

Figure 7:
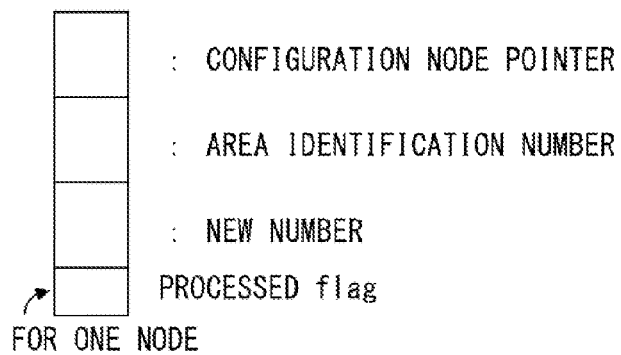
FIG. 7 is an explanatory view (2) of the data structure used in an embodiment of the present invention.

FIG. 7 illustrates the data for identification of the sectioned area.

nodeinf stores the number for identification of the sectional plane or sectioned area as associated with the node number of the component node. Each component node has a configuration node pointer (representing a component in a chain structure), an area identification number, a new number, and a processed flag. These elements are held as the number of node to array.

Figure 8B:
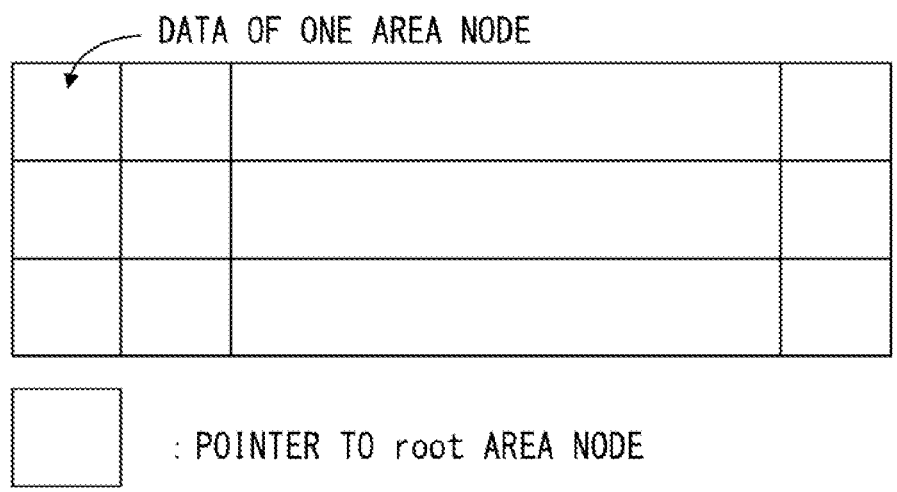

FIGS. 8A and 8B illustrate the data structure indicating the structure of a sectioned area.

When an area is sectioned, the sectional plane is removed from the area, and two areas having no common portions are generated. In the elimination tree, there is no edge from the two areas toward the component node in other areas without passing through the component node of the sectional plane. The sectioning operation is recursively repeated and stopped at a certain depth. Stopping the operation at a certain depth refers to stopping it when the number of nodes configuring the sectional plane to be removed in the recursive sectioning reaches the level of the block width of the super node with the coupling of nodes taken into account.

When the depth is S, the number of the areas remaining after the sectioning operation is 2S while the number of the sectional planes is 2S−1. The areas and sectional planes remaining after the sectioning operation is represented as nodes (area nodes) in the tree structure. The first sectional plane is defined as a root, and the halved areas are further sectioned by a sectional plane and coupled as the branches of a tree. The coupling operation is sequentially performed and the sectional plane obtained by the final sectioning operation is defined as a child, and couples the nodes representing the two sectioned areas.

In FIG. 8A, the parent of each node (indicating the sectioned area, that is, an area node) indicates a node of the sectional plane of a small section at one level. A child indicates a sectional plane at an enhanced level or a node number indicating the sectioned area at the deepest level. A brother indicates a number of the brother (area node at the same depth level) of the child in the array.

The sectional plane indicated by an area node or the area node of the sectioned area is represented by a pointer from the head of the chain structure of a component node (configuration node of an elimination tree). The total number of component nodes of the areas indicated by an area node is stored in the column of the total number of component nodes. The numbers for identification of the sectional plane and the sectioned area are stored in the column of the tree node number.

In FIG. 8B, the data of the structure of FIG. 8A is stored as an array. If the depth level is S, the data of the sectioned area and the sectional plane are represented as an array having 2**(S+1)−1 elements. In addition, the pointer indicating a root area node is separately held.

Figure 9:
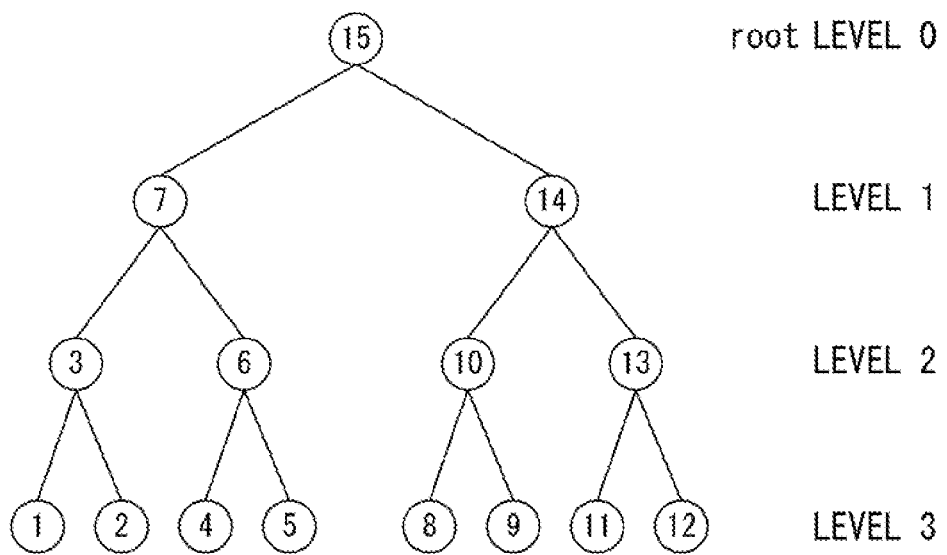
FIG. 9 is an explanatory view (4) of the data structure used in an embodiment of the present invention.

FIG. 9 indicates the tree structure when an area is sectioned up to the depth of level 3.

The numbering operation illustrated in FIG. 9 is performed by assigning a number in the order of the depth first search for the tree. In FIG. 9, the number of root area node is 15 at level 0. The parent area node connected to the area nodes 1 and 2 at level 3 is 3 at level 2. The parent area node of the area nodes 4 and 5 at level 3 is 6. The parent node of the area nodes 3 and 6 at level 2 is the area node 7 at level 1. Similarly, the parent of the area nodes 8 and 9 is the area node 10, the parent of the area nodes 11 and 12 is the area node 13, and the parent of the area nodes 10 and 13 is the area node 14. The root area node 15 is the parent of the area nodes 7 and 14. Inversely, the area nodes 1 and 2 are the child nodes of the area node 3, the area nodes 4 and 5 are the child nodes of the area node 6, the area nodes 3 and 6 are the child nodes of the area node 7, and the area nodes 7 and 14 are the child nodes of the root area node 15. The area node 2 is a brother to the area node 1. The rests have similar relationships.

FIG. 10 illustrates the data structure of the stack used in the numbering operation.

Stacksf and stcknode are prepared. A one-dimensional array is used as a stack. In the system 1, each of stacksf and stacknode is provided in the entire process. In the system 2, one stacksf is provided for the entire process, but stacknode is provided for each sectioned area.

When the numbering operation is performed, a permutation vector is provided. The permutation vector returns i in response to the value j when the i-th component node is assigned j. That is, the equation of perm(j)=1 holds.

FIG. 11 is a flowchart of the entire process according to an embodiment of the present invention.

A sparse matrix is expressed in a graph (elimination tree), and is recursively sectioned, and is controlled as to whether or not the sectioning operation is to be further performed by combining nodes (columns) from the upper limit of the block width used when a super node is generated. It is to configure a super node of an appropriate size by combining nodes configuring a sectional plane.

In step S10, a sparse matrix is expressed in a graph (elimination tree) and the data expressing an adjacent node is generated. In step S11, the graph is sectioned to generate sectioned areas A and B, and a generates a sectional plane C. Then, a graph representing the areas A and B is generated. It is determined whether or not the minimum value of the number of configuration nodes of all sectional planes C is equal to the number of blocks of the super node. If it is equal to the number, the sectioning operation is stopped and the process in step S12 is performed. If it is not, control is returned to step S11 for all sectioned areas, and the sectioning operation is performed. In step S12, a binary tree having sectioned areas and a sectional plane is generated, and components are stored as a chain. In addition, the component node belonging to the area node in a binary tree is assigned the numbers identifying a sectioned area and a sectional plane. In this case, stacksf and stacknode are used. A result of the numbering operation is stored in the permutation vector.

The process procedures of the following process are different between the systems 1 and 2.

Process Procedure of System 1:

When the maximum depth level of the generated tree of area nodes is S, there are 2**(S+1)−1 area nodes.

The process is performed in order from the root area node in the depth first search. When the node to be processed is a leaf node (node having no child node), its parent node refers to a sectional plane.

1) When the node retrieved by the depth first search is a leaf node, the chain of the component node configuring the sectional plane as the parent node of the leaf node is traced, and the component node is piled on the stack (stacksf).

A component node is retrieved one by one from the stacksf, and the node adjacent to the retrieved node is scanned. If the adjacent node is an element node belonging to the sectioned area which is currently a target node, and is a node not yet piled on the stacknode, then a processed flag is set and the node is piled on the stacknode.

Afterwards, nodes are scanned one by one in order from the bottom in the stacknode, and the node adjacent to the scanned component node is sequentially checked. If the checked node belongs to the target sectioned area and has not been piled on the stacknode, then a selected flag is set and the node is piled on the stacknode. The process is continued until there is no more component nodes to be scanned.

Then, the node of the stacknode is retrieved from top to bottom, and assigns a relative number starting with 1. The total number is the number already assigned plus relative numbers. It is set for each component node.

2) When the node retrieved in the depth first search is not a leaf node, the chain representing the component nodes configuring the sectional plane is traced, and a relative number is assigned starting with 1. The total number is the number already assigned plus relative numbers. It is set for each node.

3) Finally, the one-dimensional array storing the information about nodes in the order of original node number is scanned in the order of node number. Assume that the i-th element stores a newly assigned number j. The permutation vector is generated by storing perm(j)=i in the vector perm indicating the permutation.

Process Procedure of System 2:

When the maximum depth level of the generated tree of area nodes is S, there are m=2S leaf nodes. Then, 2S stacknodes are provided for each leaf node and used.

Then, the next process is performed when the sectional plane is passed during the trail the path of the tree in the depth first search toward the leaf.

The component node of the sectional plane is piled on the stacksf by tracing the chain of component nodes. When this process is completed, nodes are retrieved one by one from the stacksf, and the adjacent node is scanned. If the scanned node is a leaf node, that is, the node at the deepest level, and is a component node of a sectioned area, then the component node corresponding to the leaf node is piled on the stacknode. Then, the processed flag of the node is set in the on place.

1) When the node retrieved by the depth first search is a leaf node, a component node is retrieved in order from the bottom of the stacknode if the leaf node is reached in the depth first search. The node adjacent to the component node is scanned, and the processed flag of the component node of the leaf node which has not been processed yet is set ON, and the node is piled on the stacknode. The process is repeated, and when there is no more node to be retrieved, a node is sequentially retrieved from the top to the bottom of the stacknode, and a relative number is assigned to the configuration node starting with 1.

A relative number is added to the total number of nodes which are component nodes up to the leaf node, thereby assigning numbers.

2) When the node retrieved in the depth first search is not a leaf node, the chain representing the component nodes configuring the sectional plane is traced, and a relative number is assigned starting with 1. The total number is the number already assigned plus relative numbers. It is set for each node.

3) Finally, the one-dimensional array storing the information about nodes in the order of original node number is scanned in the order of node number. Assume that the i-th element stores a newly assigned number j. The permutation vector is generated by storing perm(j)=i in the vector perm indicating the permutation.

FIGS. 12 through 20 are the detailed process flows according to an embodiment of the present invention.

Figure 12:
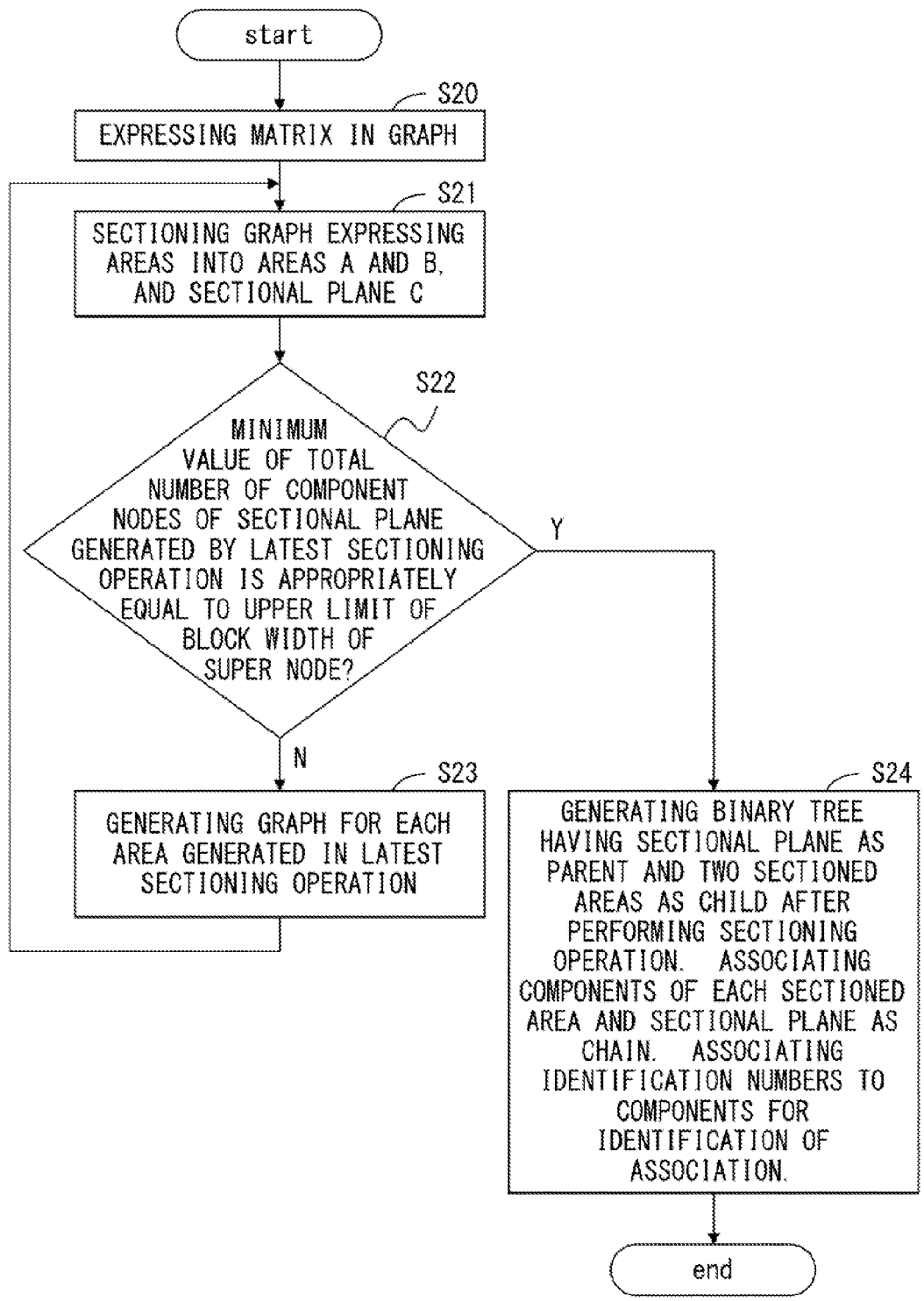
FIG. 12 is a detailed process flow (1) according to an embodiment of the present invention.

In FIG. 12, a sparse matrix is represented by a graph (elimination tree) and recursively halved. The sectioning operation is stopped after determining whether or not the minimum value of the total number of nodes configuring all sectional planes has approximately reached the number of blocks of the super node for each level of the sectioning operation. Then, a binary tree is generated, the chain of component nodes of a sectional plane and a sectioned area is generated, and an identification number is set to indicate to which sectional plane or sectioned area a node belongs.

In step S20, a matrix is represented by a graph. In this example, a graph refers to an elimination tree. In step S21, the graph indicating an area (graph of a space indicating lattice points and the connection between them) is sectioned into an area A, an area B, and a sectional plane C. That is, the discrete space is sectioned into each sectioned area and sectional plane.

In step S22, it is determined whether or not the total number of component nodes of the sectional plane generated in the latest sectioning operation is around the upper limit of the block width of a super node (number of columns coupled into a super node). If the determination in step S22 is NO, then a graph (elimination tree) is generated for each area generated in the latest sectioning operation in step S23, and control is returned to step S21. If the determination in step S22 is YES, then a binary tree having a sectional plane generated in the sectioning operation as a parent node and two sectioned areas as child nodes (a tree in the area, and a tree having an area node as a configuration node in the data structure illustrated in FIG. 8) is generated in step S24. The component nodes of each sectioned area and sectional plane are associated by a chain with a sectioned area and a sectional plane. To identify the association, a component node is associated with an identification number. That is, the area identification number indicating to which area each component node of the elimination tree belongs is input to an area identification number area in the data format in FIG. 7 for each component node.

FIGS. 13 through 16 are process flowcharts of the system 1.

Figure 13:
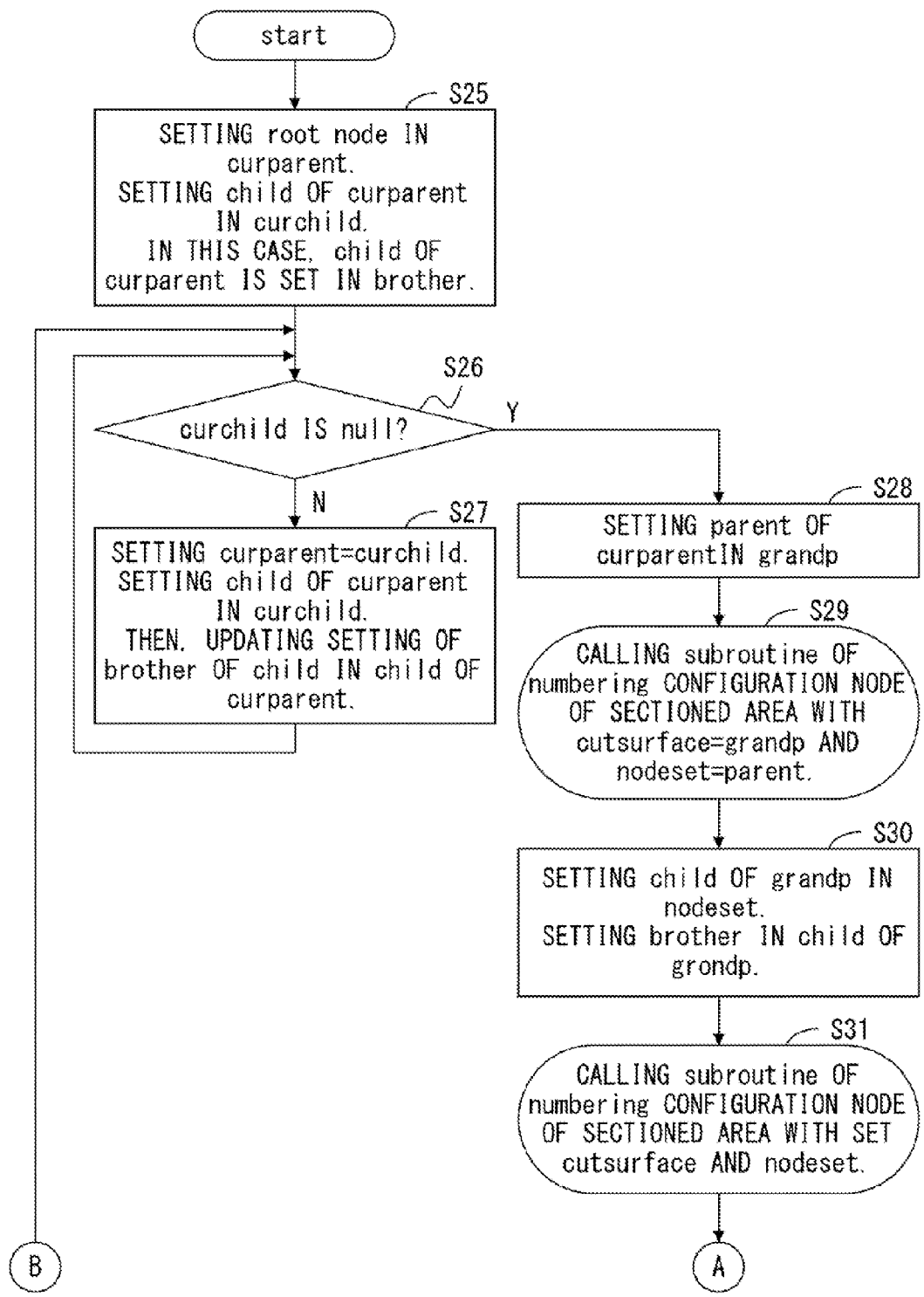
FIG. 13 is a detailed process flow (2) according to an embodiment of the present invention.
Figure 14:
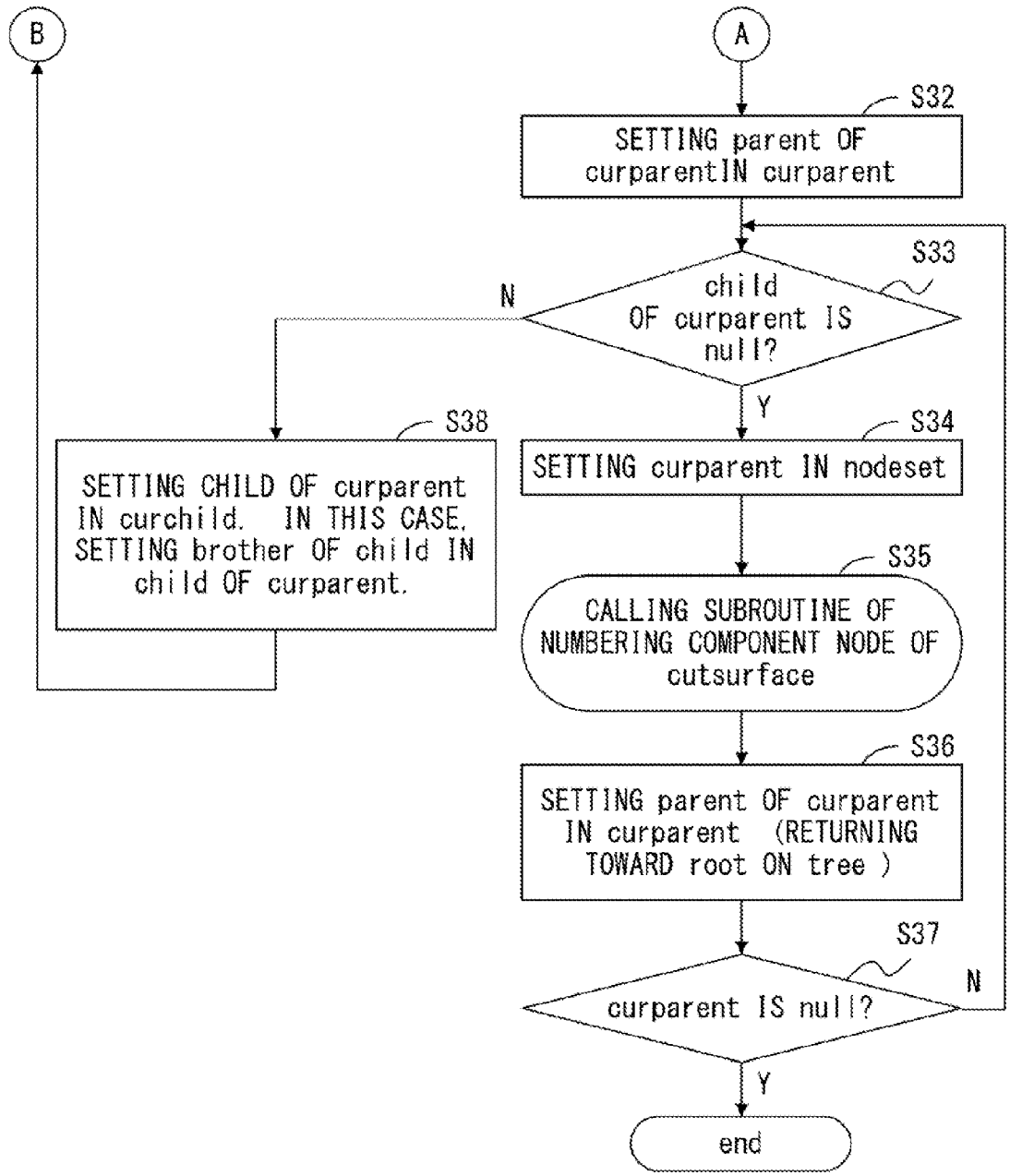
FIG. 14 is a detailed process flow (3) according to an embodiment of the present invention.

In FIGS. 13 and 14, a tree which is a set of component nodes of an elimination tree and a tree of an area node indicating a sectioned area is numbered by sequentially tracing the tree from the root in the depth first search order. The tree is a binary tree, and the depth level of the leaf node is the same. If there is a brother, it is necessarily coupled.

In step S25, a root node is set in the variable curparent. Then, the child of the curparent is set in the variable curchild. Then, another child of the curparent is set in brother. In this case, another which is generated in one sectioning operation is set as brother.

In step S26, it is determined whether or not the curchild is null, that is, whether or not it exists. If the determination in step S26 is NO, curchild is set in curparent, and the child of curparent is set in curchild. Then, brother is set as the child of curparent, and control is returned to step S26. If the determination in step S26 is YES, the parent of curparent is set in the variable grandp. In step S29, grandp is set in cutsurface, and a parent is set in nodeset, and the subroutine of numbering the component node of a sectioned area is called.

In step S30, the child of grandp is set in nodeset, and a brother is set in the child of grandp. In step S31, in the set cutsurface and nodeset, the subroutine of numbering the component node of a sectioned area (described later) is called. In step S32, the parent of curparent is set in curparent.

In step S33, it is determined whether or not the child of curparent is null, that is, whether or not there is the child. If the determination in S33 is NO, then the child of curparent is set in curchild and a brother is set in another child of curparent in step S38, and control is returned to step S26.

If the determination in step S33 is YES, then curparent is set in nodeset in step S34. In step S35, the subroutine of numbering the component node of cutsurface is called. In step S36, the parent of curparent is set in curparent. This operation refers to returning toward the root in the tree representing the sectioning of the area of area nodes. In step S37, it is determined whether or not curparent is null, that is, whether or not there is the curparent. If the determination in step S37 is YES, all area nodes have been processed, thereby terminating the process. If the determination in step S37 is NO, control is returned to step S33.

Figure 15:
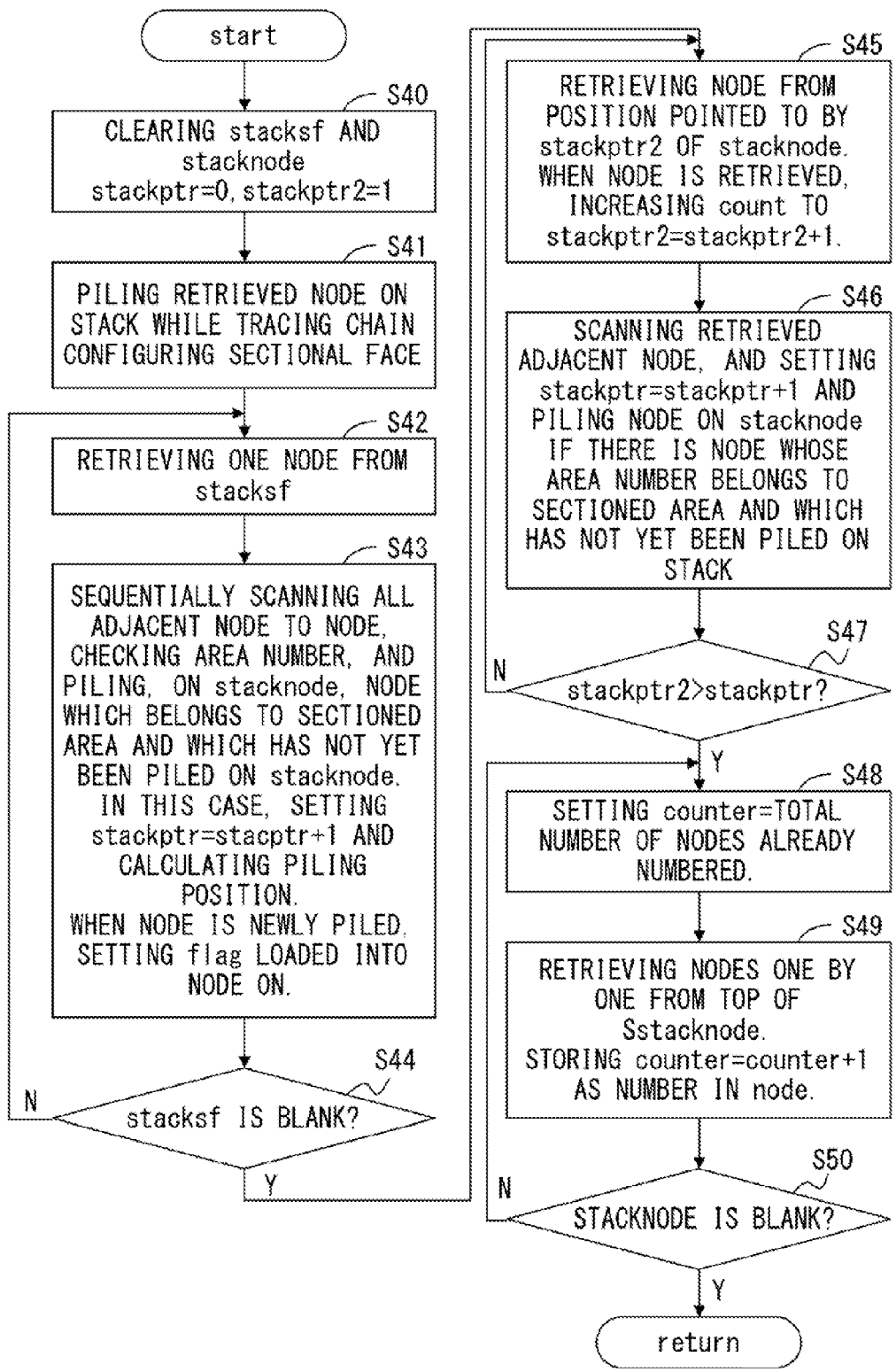
FIG. 15 is a detailed process flow (4) according to an embodiment of the present invention.

FIG. 15 is a process flow of the subroutine in steps S29 and S31 in FIG. 13.

In FIG. 15, a number is assigned to the component node of the sectioned area corresponding to the leaf of the tree configured by area nodes in order from the component node farther from the set of component nodes configuring the sectional plane.

In step S40, stacksf and stacknode illustrated in FIG. 10 are cleared. The pointers stackptr and stackptr2 indicating the positions in the stack are initialized to 0 and 1 respectively. In step S41, the chain of the component node configuring the sectional plane is traced, and the component node belonging to the destination area is retrieved, and the retrieved node is piled on stacksf. In step S42, one component node is retrieved from stacksf. In step S43, all adjacent component nodes of the component node are sequentially scanned, the area numbers are checked, and the component node which belongs to the currently processed sectioned area but has not yet been piled on stacknode is piled in stacknode. In this case, set stackptr=stackptr+1, and the position in which the component node is piled is calculated. When a component node is newly piled on the stack, the processed flag of the component node is set ON (refer to FIG. 7).

In step S44, it is determined whether or not stacksf is blank. If the determination in step S44 is NO, control is returned to step S42. If the determination in step S44 is YES, control is passed to step S45. In step S45, a component node is retrieved from the position pointed to by stackptr2 of stacknode. If it is retrieved, the count is incremented to stackptr2=stackptr2+1. In step S46, the node adjacent to the node retrieved from the stack is scanned, and if there is a component node which belongs to the sectioned area having the area number currently being processed and has not yet been piled on the stack, then stackptr=stackptr+1 is set, and the node it piled on the stacknode.

In step S47, it is determined whether or not stackptr2>stackptr is true. If the determination in step S47 is NO, control is returned to step S45. If the determination in step S47 is YES, then the total number of nodes numbered up to this point is set in the variable counter in step S48. In step S49, component nodes are retrieved one by one from the top of stacknode, counter=counter+1 is calculated, and the resultant value is stored in the area (refer to FIG. 7) having a new number of the component node. Retrieving from the top of stacknode refers to retrieving from the component node last piled on the stack. In step S50, it is determined whether or not stacknode is blank. If the determination in step S50 is NO, control is returned to step S49. if the determination is YES, the subroutine is exited.

Figure 16:
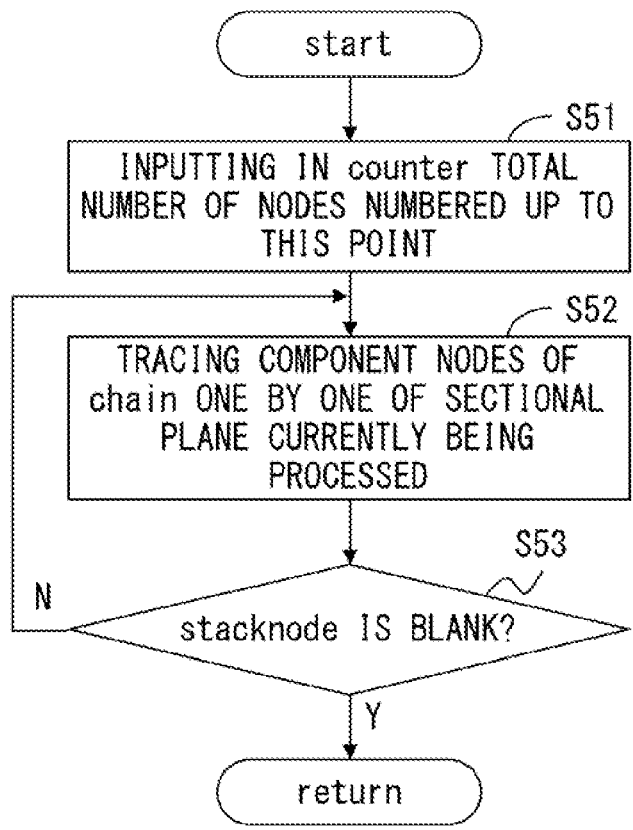
FIG. 16 is a detailed process flow (5) according to an embodiment of the present invention.

FIG. 16 is a detailed flow of step S35 in FIG. 14, and is a process flow of the subroutine of numbering the configuration node configuring a sectional plane.

In step S51, the total number of nodes numbered up to this point is substituted in counter. In step S52, the component node of the sectional plane currently being processed is retrieved one by one by tracing the chain, and counter=counter+1 is stored as a new number of the retrieved component node. In step S53, it is determined whether or not stacknode is black. If the determination is NO, control is returned to step S52. If the determination is YES, the subroutine is exited.

FIGS. 17 through 20 is a flowchart of the system 2 corresponding to FIGS. 13 through 16.

The numbering operation is performed by tracing from the root the tree representing the set of area nodes in the order of depth first search. When the tree is traced in the order of depth first search using the child relationship, the node representing the sectional plane is passed. In this case, the component node adjacent to the component node of the sectional plane and belonging to the sectioned area is piled on stacknode of the corresponding sectioned area. Then, the component node of the sectioned area is defined as the starting set in numbering in the breadth first search. The numbering operation on the components of the sectional plane is the same as the operation in the system 1. The tree formed by the area nodes is a binary tree, and the depth level of the leaf node is the same. If there is a brother, it is necessarily coupled.

The routine of numbering the component nodes of a sectional plane is the same as the operation in the system 1. The information about the component node of a binary tree formed by area nodes includes a flag indicating the passage status.

Figure 17:
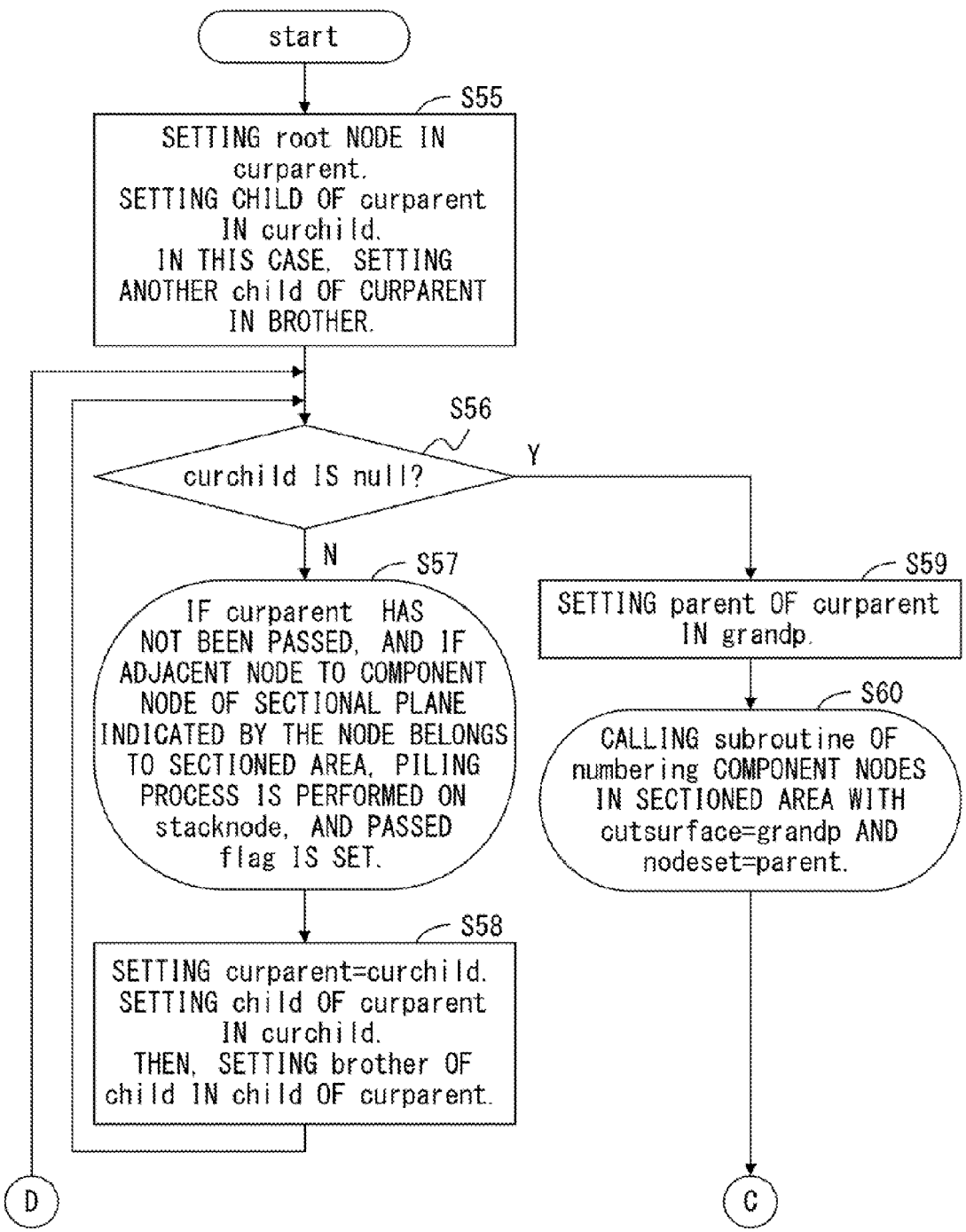
FIG. 17 is a detailed process flow (6) according to an embodiment of the present invention.
Figure 18:
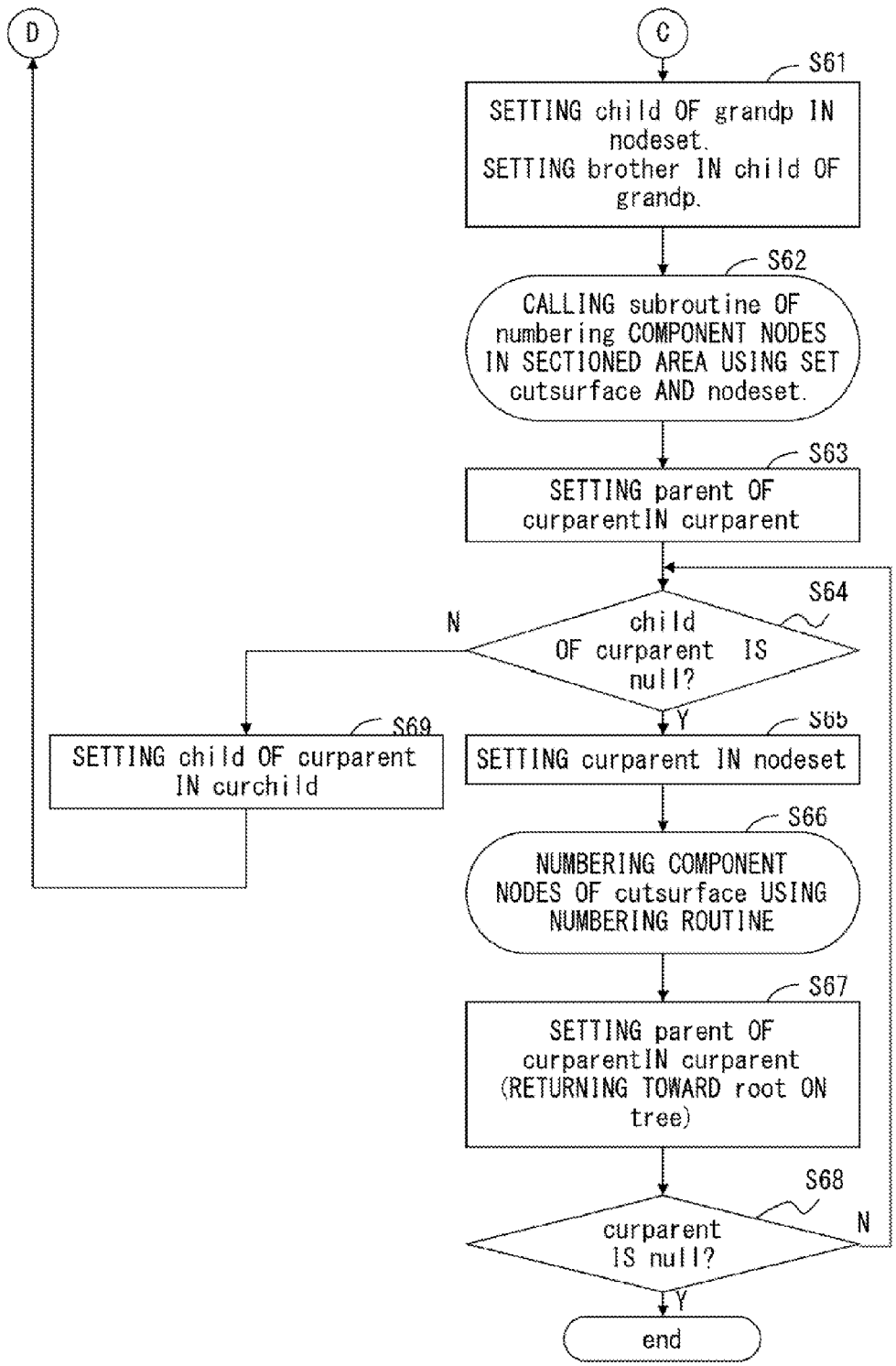
FIG. 18 is a detailed process flow (7) according to an embodiment of the present invention.

In FIGS. 17 and 18, the root node of a tree is set formed by area nodes is set in curparent first in step S55. The child of curparent is set in curchild. In this case, another child of curparent is set in brother. In step S56, it is determined whether or not curchild is null, that is, whether or not it exists. If the determination in step S56 is NO, and if the curparent has not been passed, that is, it has not been processed, then when the node adjacent to the component node of the sectional plane representing the area node belongs to a sectioned area in the subroutine (described later), the component node of the area is piled on stacknode, and a passed flag is set in step S57.

In step S58, curparent=curchild is set. That is, the child of the updated curparent is set in curchild. Then, the brother of child is set in another child of curparent, and control is returned to step S56.

If the determination in step S56 is YES, the parent of curparent is set in grandp in step S59. In step S60, the subroutine of numbering the component nodes of a sectioned area is called with cutsurface=grandp, and nodeset=parent. In step S61, the child of grandp is set in nodeset, and in another child of grandp, the brother of the child is set. In step S62, the subroutine of numbering the component nodes of a sectioned area is called in the set cutsurface and nodeset.

In step S63, the parent of curparent is set in curparent. In step S64, it is determined whether or not the child of curparent is null, that is, whether or not it exists. If the determination in step S64 is NO, the child of curparent is set in curchild in step S69, and control is returned to step S56.

If the determination in step S64 is YES, curparent is set in nodeset in step S65, and the subroutine of numbering the component nodes of cutsurface is called in step S66. In step S67, the parent of curparent is set in curparent. That is, control is returned in the root direction in the tree representing a sectioned area. In step S68, it is determined whether or not curparent is null, that is, whether or not it exists. If the determination in step S68 is NO, then control is returned to step S64. If the determination is YES, the process is terminated.

Figure 19:
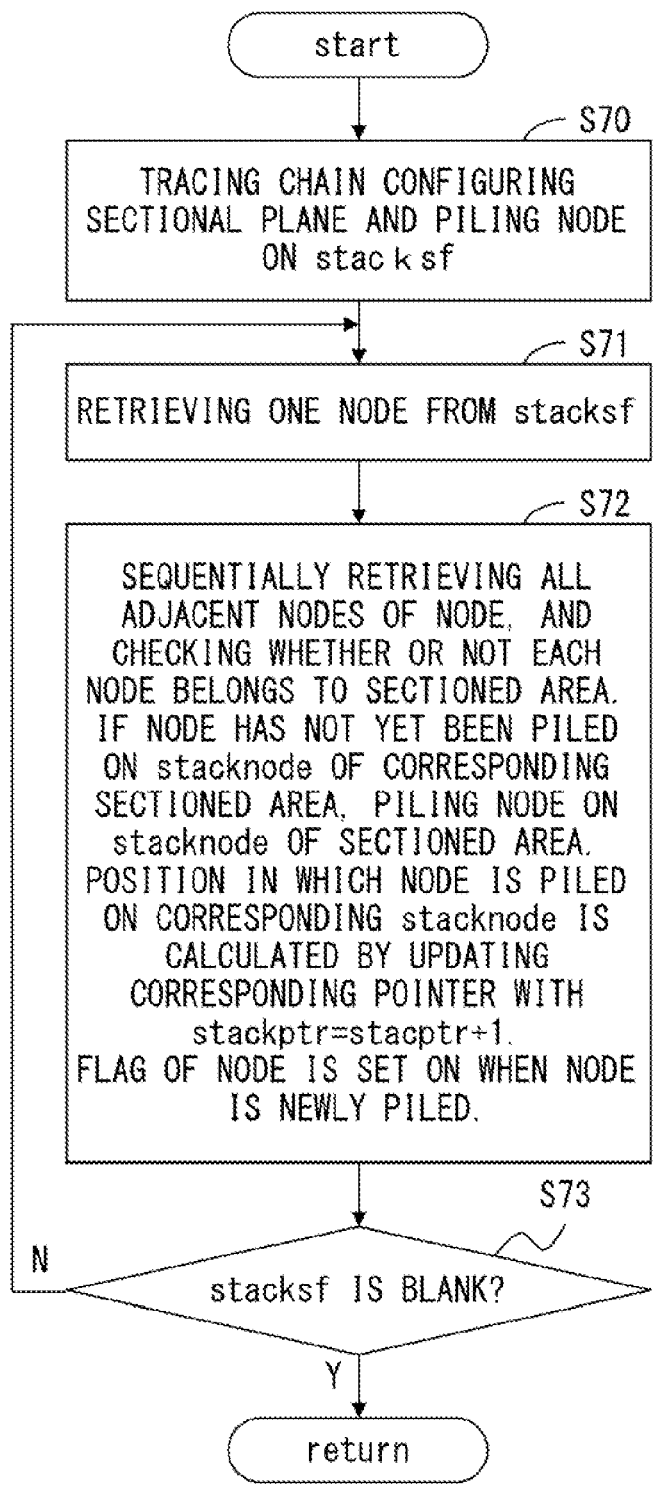
FIG. 19 is a detailed process flow (8) according to an embodiment of the present invention.

The subroutine in FIG. 19 is the subroutine in step S57 illustrated in FIG. 17, and is called when a tree formed by area nodes is traced in the direction of leaves in the depth first search, and when the nodes are first passed.

In this case, when the component node of a sectional plane is retrieved, and its adjacent node belongs to a sectioned area, stacknode is held for each leaf node corresponding to the sectioned area. The position in which a node is piled on each stack is first cleared in the numbering process (stackptr=0 for each stacknode).

In FIG. 19, the chain of component nodes configuring a sectional plane is traced and the component nodes are piled on stacksf in step S70. In step S71, one node is retrieved from stacksf. In step S72, all adjacent nodes to the current component node are sequentially retrieved, and it is checked whether or not they belong to the same sectioned areas. If it is not piled in stacknode of the corresponding sectioned area, it is piled on the stacknode of the sectioned area. The position in which it is piled on the corresponding stacknode is calculated by updating the corresponding pointer with stackptr=stackptr+1. When a component node is newly piled, the processed flag of the component node is set ON. In step S73, it is determined whether or not stacksf is blank. If the determination is YES, the subroutine is exited. If it is NO, control is returned to step S71.

FIG. 20 is a process flow of the subroutine called in steps S60, S62, and S66 in FIG. 18. The process of piling a node which is piled on stacknode is performed. The node belongs to the same sectioned area in the adjacent nodes while tracing the starting node group for breadth first search from the bottom of the stack, and has not been scanned.

In FIG. 20, the pointer is initialized as stackptr2=1 in step S80. In step S81, anode is retrieved from the position pointed to by stackptr2 of stacknode. When it is retrieved, the count is increased to stackptr2=stackptr2+1. In step S82, the node adjacent to the retrieved node is scanned. If there is a node which belongs to the sectioned area having the same area number and has not yet been piled on the stack, then stackptr=stackptr+1 is set and the node is piled on the stacknode. In step S83, it is determined whether or not stackptr2>stackptr holds. If the determination in step S83 is NO, control is returned to step S81. If the determination in step S83 is YES, the total number of nodes numbered up to this point is set in counter in step S84. In step S85, the component nodes are retrieved one by one in order from the top of stacknode, and a new number area stores counter=counter+1 as a node number of the component node (refer to FIG. 7). Retrieving from the top of stacknode refers to first retrieving the last piled component node on the stack. In step S86, it is determined whether or not stacknode is blank. If the determination is NO, control is returned to step S85. If it is YES, the subroutine is exited.

Figure 21:
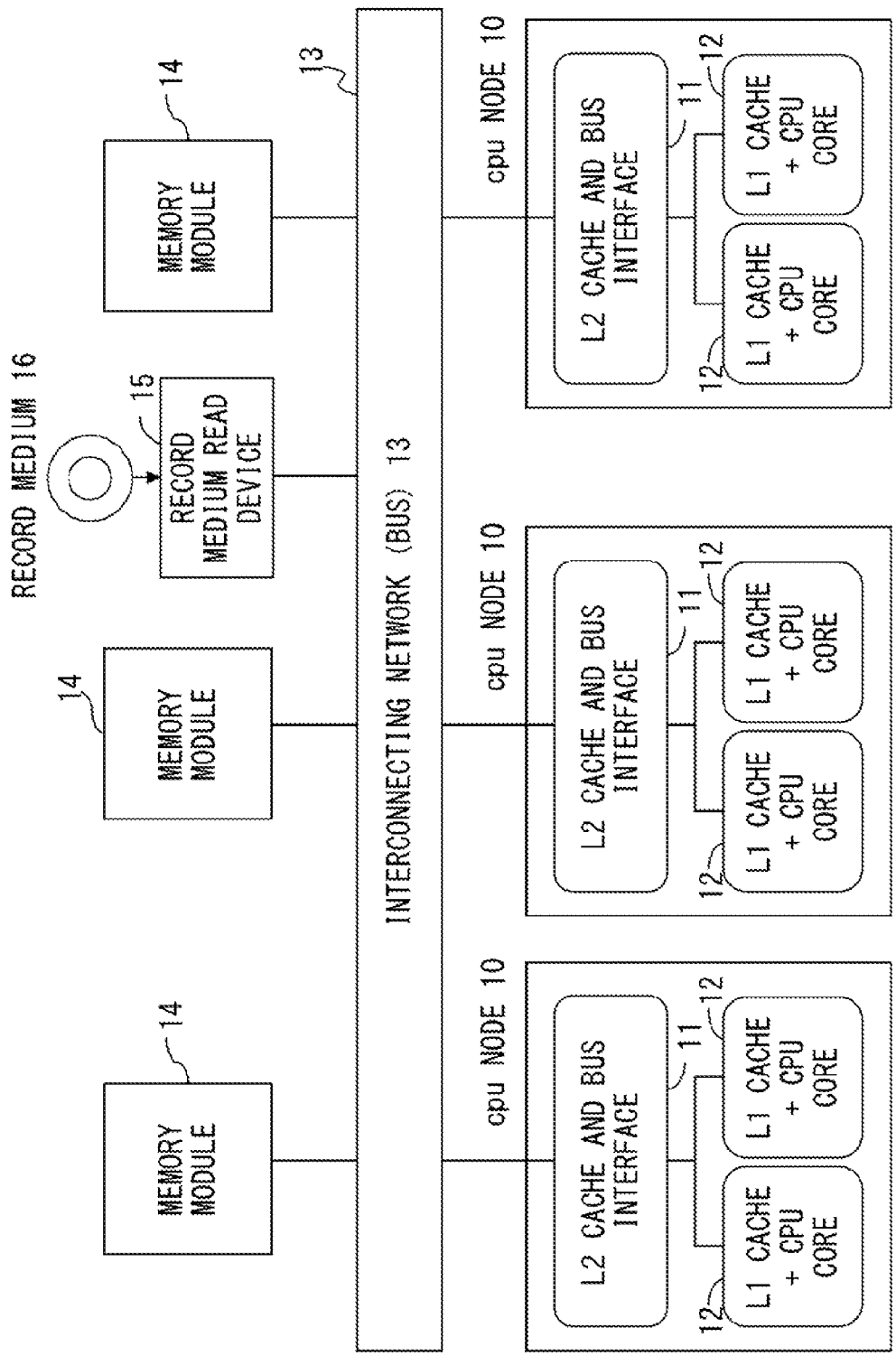
FIG. 21 is an explanatory view of the hardware configuration of the shared memory scalar parallel computer according to an embodiment of the present invention.

FIG. 21 is an explanatory view of the hardware configuration of the shared memory scalar parallel computer according to an embodiment of the present invention.

A multi-core CPU 10 includes a plurality of CPU cores (with built-in L1 cache) 12 in one CPU node, and each core shares L2 cache and a bus interface 11. Logically, each CPU core appears to operate as one CPU.

In the example illustrated in FIG. 21, one CPU node includes two CPU cores. One CPU node can include four or more CPU cores. Although one CPU node includes 8 CPU cores, it can be regarded as an SMP (shared memory parallel computer). In this example, a CPU refers to a CPU core. The CPU is assigned each thread and processed, and a thread refers to a process unit for the OS to perform parallel processing. In the element data of a sparse matrix, the necessary data for the processing is distributed and held in memory module 14, and stored in L2 cache through a interconnecting network (bus) 13. Then, the data of the component nodes of the sparse matrix configuring a super node is loaded from the L2 cache, and calculated by the CPU core. The larger the width of the super node is, at the lower frequency the load store of the data can be performed to the L1 cache with respect to the computational complexity of the CPU core, thereby realizing high-speed computation.

The algorithm of the embodiment above can be implemented as a program. The program is stored in a record medium 16, and read by a record medium read device 15. The program read by the record medium read device 15 is stored in any of the memory modules 14. The record medium 16 can be a portable medium such as CD-ROM, a flexible disk, a DVD, Blu-Ray, etc. The program can be executed as stored in the memory module 14, or can be executed while being read from the record medium 16.

The embodiment above can be applied to a field in which a mathematical model is analyzed by obtaining a solution of linear simultaneous equations expressed by a sparse symmetric positive definite matrix generated from a simulation or a mathematical model, and a field in which a simulation is performed by performing an analysis using a finite element method, a partial differential equation, etc.

The calculation of the matrix by the ordering in the embodiment above is compared with the calculation of the matrix rearranged by the ordering generated by the standardized nested dissection.

In the parallelized Cholesky decomposition, the performance of conducting the Cholesky decomposition by the ordering according to the present embodiment is approximately seven times as fast as the Cholesky decomposition on the matrix rearranged by compared methods.

Described below is a result of comparing the ordering according to the present embodiment with the standardized nested dissection ordering (generated by the METIS V4.0) as the ordering generated by repeating the sectioning operation until the complete sectioning.

<1. Explanation of Ordering>

Each dimension of an equation obtained by a discrete Laplace's equation with a finite difference on a three-dimensional cube is sectioned into 60 parts. That is, $60^3$ variables appear in this case. When each dimension is halved and a boundary surface is removed by a nested dissection at one level, 8 small cubes are generated. The process is performed at 3 levels. The ordering is obtained by numbering the $8^3$ generated small cubes.

<2. Data>

|  | Number of threads | | | | | | | |
| --- | --- | --- | --- | --- | --- | --- | --- | --- |
|  | 1 | 2 | 4 | 8 | 16 | 32 | 64 | 128 |
| 3 levels | 74.667 | 40.874 | 28.432 | 15.606 | 10.955 | 7.42 | 6.407 | 6.133 |
| ND | 359.599 | 198.51 | 179.318 | 105.55 | 78.111 | 61.029 | 45.925 | 40.959 |

<3. Explanation of Data>

A shared memory scalar parallel computer M9000 (128 cores, SPARC64VII quad core CPU 2.52 GHz) is used as a computer on which the performance is calculated by performing an LDL ^T decomposition on a sparse matrix by the following ordering. The order of the sparse matrix is $60^3$. The unit is second (sec).

<Method of Ordering>

The "3 levels" are used according to the present embodiment, and the "ND" is standardized nested dissection ordering (supported by METIS 4.0).

The present embodiment can perform processing at seven or more times as fast as normal processing by parallel processing using 16 through 64 threads.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. An ordering generating method used when a sparse symmetric positive definite matrix is processed by a Cholesky decomposition or a modified Cholesky decomposition using a shared memory scalar parallel computer, the ordering generating method comprising:

recursively performing, by the shared memory scalar parallel computer, a process of sectioning a set of component nodes configuring a graph expressing the sparse symmetric positive definite matrix into two sectioned areas and a sectional plane excluding a halving sectional plane until a width of a super node generated for coupling data of component nodes and holding the data in cache memory, is reached, and sequentially assigning numbers to component nodes in order from farther component nodes from the sectional plane on one sectioned area generated by sectioning the set of component nodes by one sectioning operation, assigning numbers to component nodes in order from farther component nodes from the sectional plane on the other sectioned area, and finally assigning numbers to component nodes belonging to the sectional plane by the shared memory scalar parallel computer.

2. The method according to claim 1, wherein the numbers are assigned to a component node group configuring the sectioned areas obtained by completely performing recursively sectioning in order from farther component nodes from all generated sectional planes.

3. The method according to claim 1, wherein the numbers are assigned by piling the component nodes on a stack while tracing a connection relationship from the component node of the sectioned area connected to the component node configuring the sectional plane, and retrieving and sequentially numbering the component node from a top of the stack after completely piling all component nodes.

4. A computer-readable, non-transitory medium storing a program for causing a shared memory scalar parallel computer to execute a method used when a sparse symmetric positive definite matrix is processed by a Cholesky decomposition or a modified Cholesky decomposition, the ordering generating method comprising:

recursively performing, by the shared memory scalar parallel computer, a process of sectioning a set of component nodes configuring a graph expressing the sparse symmetric positive definite matrix into two sectioned areas and a sectional plane excluding a halving sectional plane until a width of a super node generated for coupling data of component nodes and holding the data in cache memory, is reached, and sequentially assigning numbers to component nodes in order from farther component nodes from the sectional plane on one sectioned area generated by sectioning the set of component nodes by one sectioning operation, assigning numbers to component nodes in order from farther component nodes from the sectional plane on the other sectioned area, and finally assigning numbers to component nodes belonging to the sectional plane by the shared memory scalar parallel computer.

5. A shared memory scalar parallel computer which executes an ordering generating method used when a sparse symmetric positive definite matrix is processed by a Cholesky decomposition or a modified Cholesky decomposition, the shared memory scalar parallel computer comprising:

a sectioning unit that recursively performs a process of sectioning a set of component nodes configuring a graph expressing the sparse symmetric positive definite matrix into two sectioned areas and a sectional plane excluding a halving sectional plane until a width of a super node generated for coupling data of component nodes and holding the data in cache memory, is reached; and a numbering unit that sequentially assigns numbers to component nodes in order from farther component nodes from the sectional plane on one sectioned area generated by sectioning the set of component nodes by one sectioning operation, assigns numbers to component nodes in order from farther component nodes from the sectional plane on the other sectioned area, and finally assigns numbers to component nodes belonging to the sectional plane.

* * * * *